United States Patent
Hyun et al.

(10) Patent No.: US 9,436,377 B2
(45) Date of Patent: Sep. 6, 2016

(54) REFRIGERATOR AND CONTROL METHOD THEREOF

(71) Applicant: SAMSUNG ELECTRONICS CO., LTD., Suwon-si (KR)

(72) Inventors: Sang Hun Hyun, Suwon-si (KR); Ji Sun Ann, Suwon-si (KR); Min Su Lee, Suwon-si (KR); Seong Jin Hong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 192 days.

(21) Appl. No.: 14/050,662

(22) Filed: Oct. 10, 2013

(65) Prior Publication Data

US 2014/0101589 A1  Apr. 10, 2014

(30) Foreign Application Priority Data

Oct. 10, 2012 (KR) .................. 10-2012-0112161

(51) Int. Cl.
| | |
|---|---|
| *G06F 15/00* | (2006.01) |
| *G06F 13/00* | (2006.01) |
| *G06F 3/0486* | (2013.01) |
| *G06F 3/0481* | (2013.01) |
| *F25D 29/00* | (2006.01) |

(52) U.S. Cl.
CPC ............ *G06F 3/0486* (2013.01); *F25D 29/00* (2013.01); *G06F 3/04817* (2013.01); *F25D 2400/361* (2013.01); *F25D 2500/06* (2013.01); *F25D 2700/12* (2013.01)

(58) Field of Classification Search
CPC .......................... G06F 3/04817; G06F 3/0486
USPC ........ 715/769, 771, 839, 740, 748, 810–815
See application file for complete search history.

(56) References Cited

U.S. PATENT DOCUMENTS

| | | | |
|---|---|---|---|
| 2012/0260683 A1* | 10/2012 | Cheon ................ | F25D 29/00 62/125 |
| 2013/0067375 A1* | 3/2013 | Kim et al. ................ | 715/769 |
| 2014/0304126 A1* | 10/2014 | Kim et al. ................ | 705/28 |

* cited by examiner

*Primary Examiner* — Cao "Kevin" Nguyen
(74) *Attorney, Agent, or Firm* — Staas & Halsey LLP

(57) ABSTRACT

A refrigerator includes storage chambers to store food items, and a touchscreen panel displaying a food management picture to manage the food items stored in the storage chambers, and when food addition instructions are input by the user, the touchscreen panel displays a food addition picture to add food items to be stored in the storage chamber. The refrigerator provides the food management picture through the touchscreen panel so as to easily detect storage positions, storage periods, and fresh storage periods of food items stored in the refrigerator, thus effectively managing the stored food items.

15 Claims, 21 Drawing Sheets

REFRIGERATOR AND CONTROL METHOD THEREOF

CROSS-REFERENCE TO RELATED APPLICATIONS

This application claims the benefit of Korean Patent Application No. 10-2012-0112161, filed on Oct. 10, 2012 in the Korean Intellectual Property Office, the disclosure of which is incorporated herein by reference.

BACKGROUND

1. Field

Embodiments of the present invention relate to a refrigerator having a management module managing food stored in the refrigerator and a control method thereof.

2. Description of the Related Art

In general, a refrigerator stores food at a low temperature, and thus serves to store food in a fresh state for a long time. However, even if food is stored at a low temperature, a period for which the food stays fresh is extended but the food does not stay fresh forever and thus the food should be removed before it spoils.

When food items are stored in the conventional refrigerator, storage periods of the food items may be different, and detection of positions of the food items in storage chambers and thus recognition of the storage periods of the food items may be difficult. Therefore, food may not be consumed within a period within which the food maintains freshness, and thus some food may be wasted.

SUMMARY

Therefore, it is an aspect of the present invention to provide a refrigerator which easily detects storage positions, storage periods, and fresh storage periods of food items stored in the refrigerator, and a control method thereof.

Additional aspects of the invention will be set forth in part in the description which follows and, in part, will be obvious from the description, or may be learned by practice of the invention.

In accordance with one aspect of the present invention, a refrigerator includes storage chambers to store food items, a touchscreen panel to display a food management picture including a first storage space display area displaying plural storage spaces of the storage chambers and a stored food display area displaying the food items stored in the storage chambers so as to manage the food items stored in the storage chambers, or displaying a food addition picture including a second storage space display area displaying the plural storage spaces of the storage chambers and an added food display area displaying food items to be added to the storage chambers so as to add the food items to the storage chambers, according to selection of a user, and a control unit to control the picture displayed on the touchscreen panel, wherein, when food items selected in the added food display area are moved to the second storage space display area, the touchscreen panel displays the selected food items such that the selected food items are arranged according to fresh storage periods.

The size of icons of food items displayed in the second storage space display area may be smaller than the size of icons of food items displayed in the added food display area.

The first storage space display area may further display the number of the food items stored in the storage chambers.

The second storage space display area may further display the number of food items moved and added to the second storage space display area.

Each of the first storage space display area and the second storage space display area may include a refrigerating chamber storage area, a freezing chamber storage area and a variable temperature chamber storage area.

When a food item selected from among the food items displayed in the added food display area by the user is moved to one storage area of the plural storage areas of the second storage space display area, the touchscreen panel may display the selected food item in the storage area.

When one storage area is selected from among the plural storage areas of the first storage space display area by the user, the stored food display area may display food items stored in the selected storage area.

The first storage space display area may further display the number of the food items stored in the selected storage area.

When food addition instructions are input by the user during display of the food management picture, the touchscreen panel may display the food addition picture.

The added food display area may display food groups to which the food items belong.

One food group is selected from among the food groups displayed in the added food display area by the user, the added food display area may display food items belonging to the selected food group.

When food item name direct input instructions are input by the user, the food addition picture may further display a food name input pop-up window to receive the names of the added food items input by the user.

The touchscreen panel may display a food deletion picture to delete the food items stored in the storage chambers according to selection of the user.

The food deletion picture may include a third storage space display area displaying the plural storage spaces of the storage chambers, and a deleted food display area displaying the food items stored in the storage chambers.

When one storage area is selected from among the plural storage areas of the third storage space display area by the user, the deleted food display area may display food items stored in the selected storage area.

When food deletion instructions of food items selected from among the food items displayed in the deleted food display area by the user are input, the third storage space display area may delete the selected food items.

In accordance with another aspect of the present invention, a refrigerator includes a storage chamber to store food items; a panel to display food management information to manage the stored food items; and a control unit to control the food management information displayed on the panel based on the location of the food items with respect to the storage chamber.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
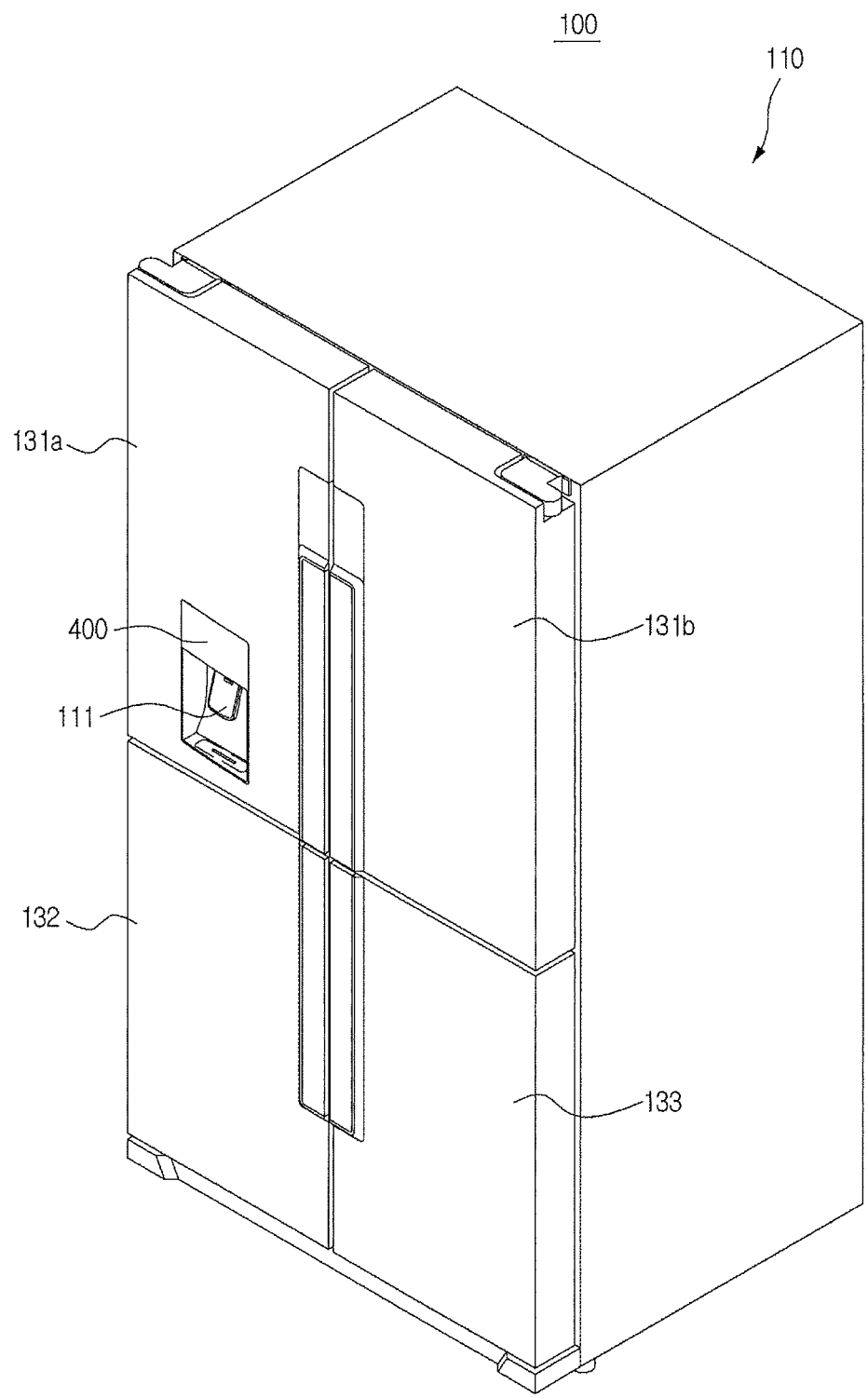
FIG. 1 is a perspective view illustrating the external appearance of a refrigerator in accordance with one embodiment of the present invention.

Reference will now be made in detail to the embodiments of the present invention, examples of which are illustrated in the accompanying drawings, wherein like reference numerals refer to like elements throughout.

Hereinafter, the embodiments of the present invention will be described in detail with reference to the accompanying drawings.

Figure 2:
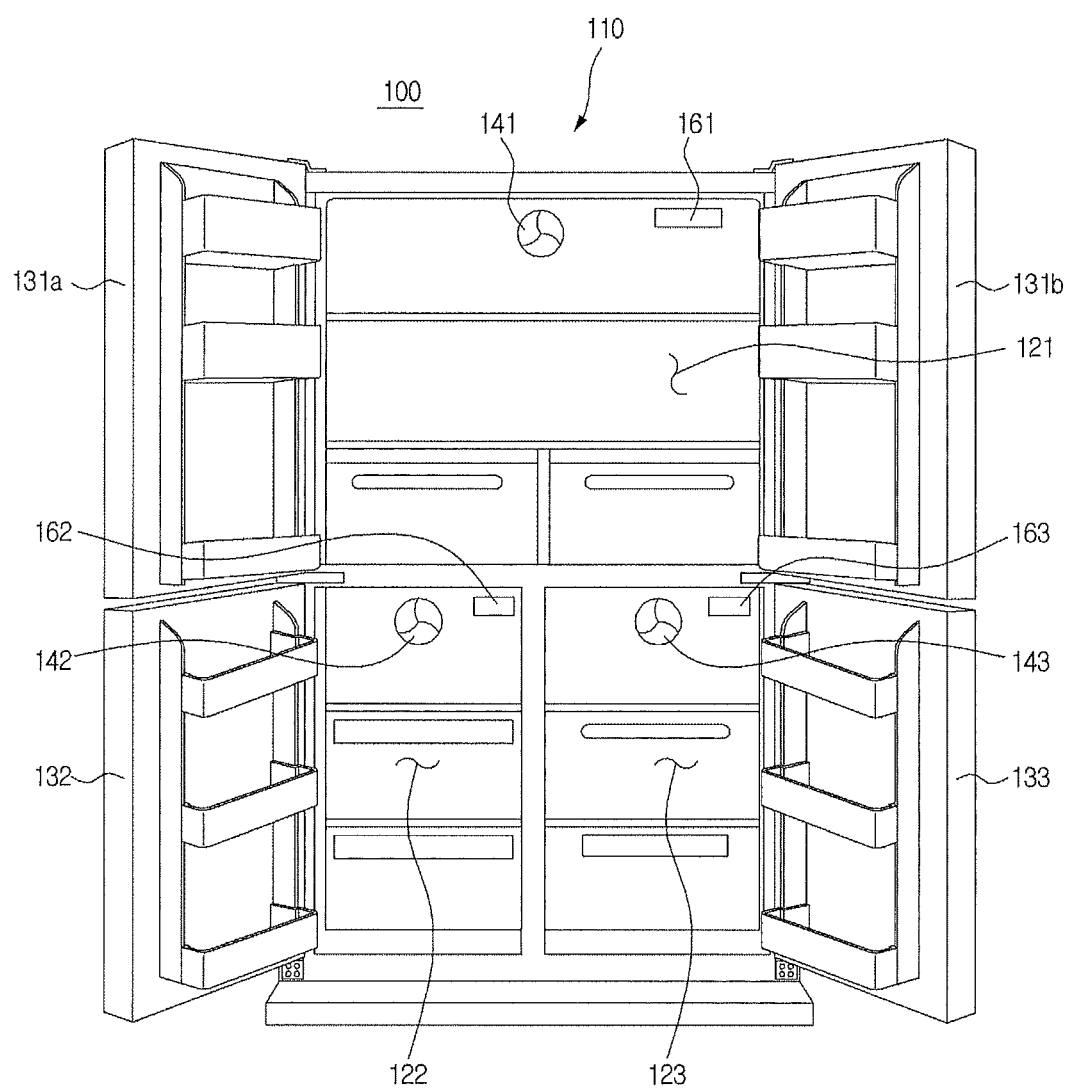
FIG. 2 is a front view illustrating the external appearance of the refrigerator in accordance with the embodiment of the present invention.
Figure 3:
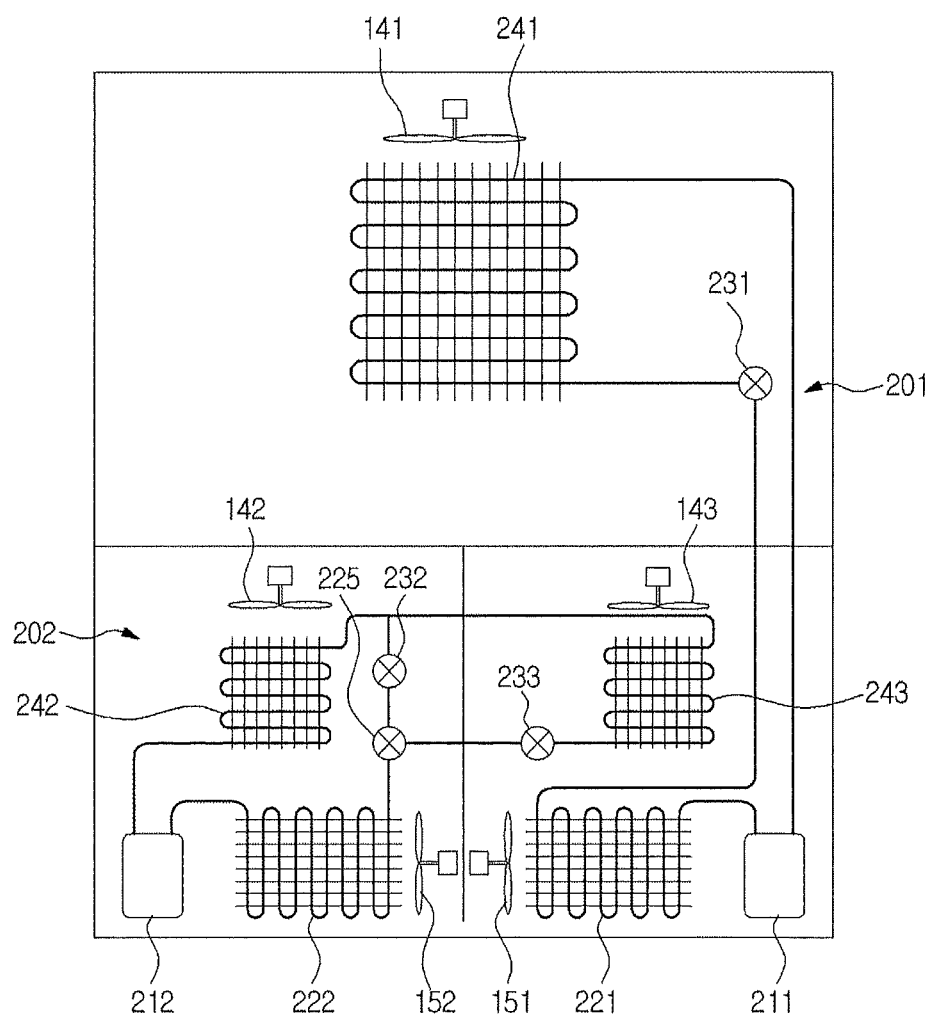
FIG. 3 is a view illustrating cooling apparatuses of the refrigerator in accordance with the embodiment of the present invention.

FIG. 1 is a perspective view illustrating the external appearance of a refrigerator in accordance with one embodiment of the present invention, FIG. 2 is a front view illustrating the external appearance of the refrigerator in accordance with the embodiment of the present invention, and FIG. 3 is a view illustrating cooling apparatuses of the refrigerator in accordance with the embodiment of the present invention.

With reference to FIGS. 1, 2 and 3, a refrigerator 100 in accordance with the embodiment of the present invention includes a main body 110 forming the external appearance of the refrigerator 100, storage chambers 121, 122 and 123 storing food, and cooling apparatuses 201 and 202 cooling the storage chambers 121, 122 and 123.

The storage chambers 121, 122 and 123 are divided by two diaphragms prepared in a T shape. A refrigerating chamber 121 storing food in a refrigerated state is provided in the upper portion of the refrigerator 100, and a freezing chamber 122 storing food in a frozen state is provided in the left region of the lower portion of the refrigerator 100. Further, a variable temperature chamber 123 storing food in a refrigerated state or a frozen state according to user selection is provided in the right region of the lower portion of the refrigerator 100. The front surfaces of the respective storage chambers 121, 122 and 123 are opened.

Storage temperature sensing units 161, 162 and 163 sensing temperatures of the respective storage chambers 121, 122 and 123 are provided in the respective storage chambers 121, 122 and 123. Specifically, a first storage temperature sensing unit 161 sensing the temperature of the refrigerating chamber 121 is provided in the refrigerating chamber 121, a second storage temperature sensing unit 162 sensing the temperature of the freezing chamber 122 is provided in the freezing chamber 122, and a third storage temperature sensing unit 163 sensing the temperature of the variable temperature chamber 123 is provided in the variable temperature chamber 123.

These storage temperature sensing units 161, 162 and 163 may employ thermistors, electrical resistances of which are varied according to temperature.

The three storage chambers 121, 122 and 123, the front surfaces of which are opened, are isolated from the outside by four doors 131a, 131b, 132 and 133. Specifically, the refrigerating chamber 121 is isolated from the outside by the two doors 131a and 131b, and each of the freezing chamber 122 and the variable temperature chamber 123 is isolated from the outside by one door 132 or 133.

A panel 400 displaying operation information of the refrigerator 100 and receiving operation instructions input by a user may be provided on the left door 131a of the refrigerating chamber 121. In an embodiment, the panel 400 may be a touchscreen panel. Further, a dispenser 111 allowing a user to dispense drinking water stored in a water tank (not shown) provided in the refrigerator 100 is provided below the touchscreen panel 400.

The cooling apparatuses 201 and 202 include compressors 211 and 212 compressing a refrigerant in a low-pressure vapor phase, condensers 221 and 222 condensing the refrigerant in the vapor phase compressed by the compressors 221 to a liquid phase and 222, expansion valves 231, 232 and 233 decompressing the refrigerant in the liquid phase condensed by the condensers 221 and 222, and evaporators 241, 242 and 243 evaporating the refrigerant in the liquid phase decompressed by the expansion valves 231, 232 and 233. Further, the cooling apparatuses 201 and 202 include a switch valve 225 switching the path of the refrigerant.

The cooling apparatuses 201 and 202 include a first cooling apparatus 201 cooling the refrigerating chamber 121, and a second cooling apparatus 202 cooling the freezing chamber 122 and the variable temperature chamber 123. The second cooling apparatus 202 cooling the two storage chambers 122 and 123 further includes the switch valve 225, as compared to the first cooling apparatus 201 cooling the one storage chamber 121. That is, the first cooling apparatus 201 includes the first compressor 211, the first condenser 221, the first expansion valve 231 and the first evaporator 241, and the second cooling apparatus 202 includes the second compressor 212, the second condenser 222, the switch valve 225, the second expansion valve 232 and the second evaporator 242.

Air blower fans 141, 142 and 143 are respectively provided on the inner walls of the refrigerating chamber 121, the freezing chamber 122 and the variable temperature chamber 123. That is, the air blower fans 141, 142 and 143 include a first air blower fan 141 provided on the inner wall of the refrigerating chamber 121, a second air blower fan 142 provided on the inner wall of the freezing chamber 122, and a third air blower fan 143 provided on the inner wall of the variable temperature chamber 123.

The air blower fans 141, 142 and 143 circulate air between ducts (not shown) in the main body 110 and the storage chambers 121, 122 and 123. That is, the air blower fans 141, 142 and 143 supply air cooled by the evaporators 241, 242 and 243 provided in the ducts (not shown) to the storage chambers 121, 122 and 123, and draw air in the storage chambers 121, 122 and 123 into the ducts (not shown) in which evaporators 241, 242 and 243 are provided to cool air in the storage chambers 121, 122 and 123.

Figure 4:
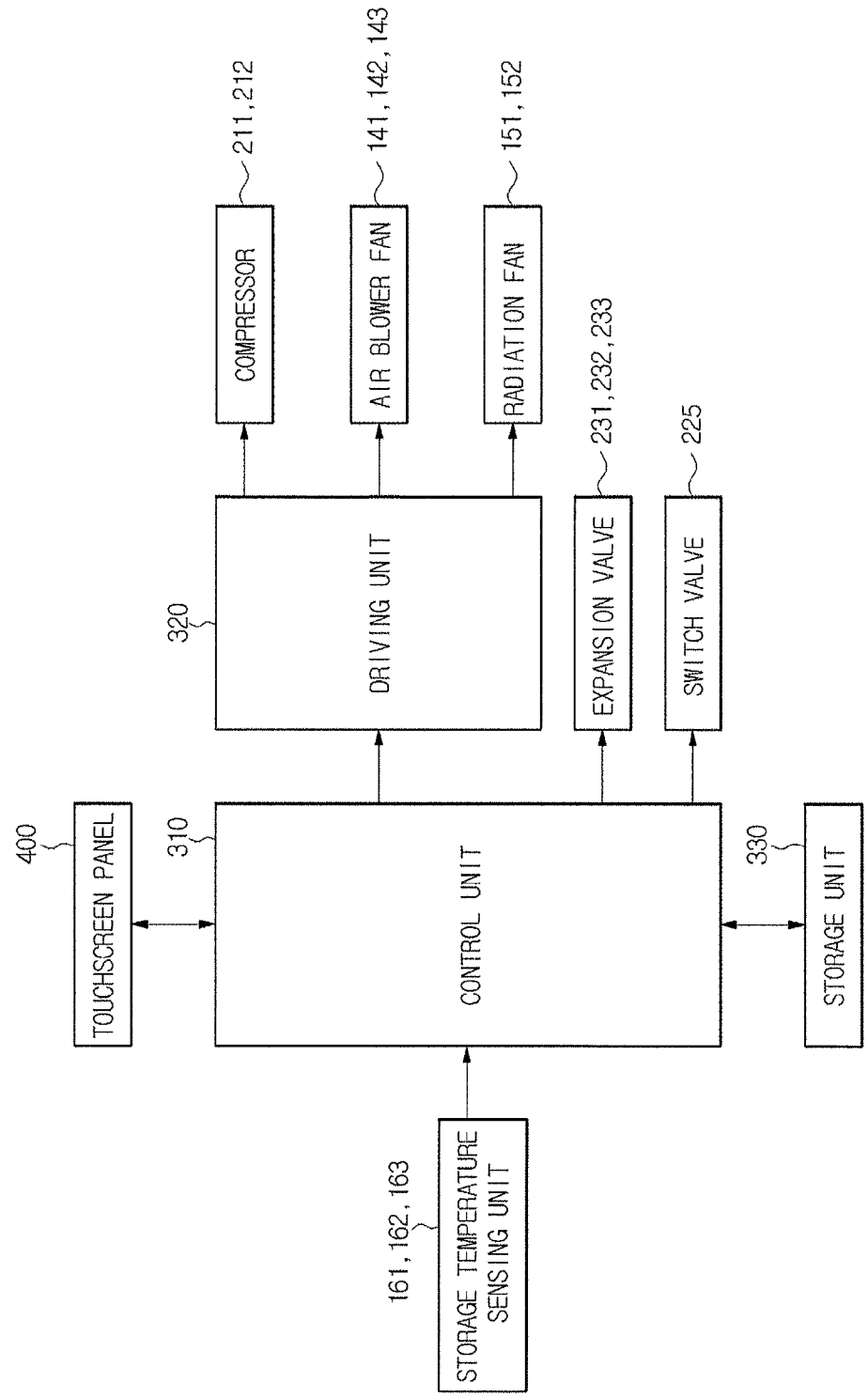
FIG. 4 is a block diagram illustrating control flow of the refrigerator in accordance with the embodiment of the present invention.

FIG. 4 is a block diagram illustrating control flow of the refrigerator 100 in accordance with the embodiment of the present invention.

Prior to description of operation of the respective components of the refrigerator 100, overall operation of the refrigerator 100 to store food for a long time will be described.

In the refrigerator 100, target temperatures to store food for a long time are set. Target temperatures of the storage chambers 121, 122 and 123 may be set to different values according to articles stored in the storage chambers 121, 122 and 123. The initial values of the target temperatures may be set when the refrigerator 100 is manufactured, and then be varied by operation of a user.

In order to maintain the temperatures of the storage chambers 121, 122 and 123 at the above-described target temperatures, the upper limits, at which the cooling apparatuses 201 and 202 of the refrigerator 100 start cooling operation, and the lower limits, at which the cooling apparatuses 201 and 202 stop cooling operation, are set. That is, when the temperatures of the storage chambers 121, 122 and 123 reach the upper limits or higher, the cooling apparatuses 201 and 202 are operated, and when the temperatures of the storage chambers 121, 122 and 123 reach the lower limits or lower, operation of the cooling apparatuses 202 and 202 is stopped.

With reference to FIG. 4, in order to control operation of the refrigerator 100, the refrigerator 100 includes the storage temperature sensing units 161, 162 and 163, the compressors 211 and 212, the air blower fans 141, 142 and 143, radiation fans 151 and 152, the expansion valves 231, 232 and 233, the switch valve 225, a driving unit 320, a storage unit 330, the touchscreen panel 400, and a control unit 310. The storage chamber sensing units 161, 162 and 163, the compressors 211 and 212, the air blower fans 141, 142 and 143, the radiation fans 151 and 152, the expansion valves 231 and 232 and the switch valve 225 have been described above, and a detailed description thereof will thus be omitted.

The driving unit 320 drives the compressors 211 and 212, the air blower fans 141, 142 and 143 and the radiation fans 151 and 152 according to a control signal from the control unit 310 which will be described later. Particularly, in order to drive the compressors 211 and 212, the driving unit 320 may employ a voltage-type inverter. The voltage-type inverter includes a converter unit rectifying commercial AC power to DC power, a condenser smoothing DC link voltage, and an inverter unit simultaneously controlling voltage and frequency in a pulse width modulation (PWM) control method of the rectified DC voltage.

The storage unit 330 stores various pieces of information regarding operation of the refrigerator 100. Specifically, the storage unit 330 stores information, such as kinds and expiration dates of food items stored in the refrigerator 100 as well as information regarding the functions of the refrigerator 100, such as the target temperatures, the upper limits and the lower limits, and provides various pieces of information to the control unit 310 according to request of the control unit 310.

The touchscreen panel 400 receives operation instructions input by a user regarding operation of the refrigerator 100, and displays information regarding operation of the refrigerator 100. The touchscreen panel 400 has a structure in which a touch panel (not shown) receiving the operation instructions input by the user and a display panel (not shown) displaying operation information of the refrigerator 100.

The touch panel recognizes coordinates of a portion contacting a part of the body of a user, and receives operation instructions input by the user based on the recognized coordinates. As the touch panel, a capacitive touch panel which recognizes coordinates of a portion contacting a part of the body of a user through change of capacitance due to contact with the part of the body of the user, or a resistive touch panel which recognizes coordinates of a portion contacting a part of the body of a user through change of electrical resistance due to contact with the part of the body of the user may be employed. The display panel displays operation information of the refrigerator 100 according to the operation instructions input by the user. As the display panel, a flat display panel, such as a liquid crystal display (LCD) panel or a light emitting diode (LED) may be employed.

The touchscreen panel 400 provides operation instructions which a user may select through a picture, and receives the operation instructions selected by the user through touch of the user. For example, when the user touches a region corresponding to a menu button, the touchscreen panel 400 serving as a display unit displays a menu having items which the user may select, and when user selects one of the items arranged on the picture and touches a corresponding region, the touchscreen panel 400 serving an input unit recognizes the item selected by the user through coordinates of the region selected by the user and receives operation instructions input by the user.

Although the refrigerator 100 in accordance with the embodiment of the present invention employs the touchscreen panel 400 receiving operation instructions input by a user and displaying operation information of the refrigerator 100, embodiments of the present invention are not limited thereto and an input unit receiving operation instructions input by a user and a display unit displaying operation information of the refrigerator may be separately provided.

The control unit 310 controls the overall operation of the refrigerator 100.

Now, basic operation of the refrigerator 100 will be described. The control unit 310 controls the driving unit 320 to operate the cooling apparatuses 201 and 202 when the temperatures of the storage chambers 121, 122 and 123 reach the upper limits or higher, and controls the driving unit 320 to stop operation of the cooling apparatuses 201 and 202 when the temperatures of the storage chambers 121, 122 and 123 reach the lower limits or lower, based on the sensing result of the storage temperature sensing units 161, 162 and 163 provided in the storage chambers 121, 122 and 123.

Further, the control unit 310 receives the operation instructions input the user through the touchscreen panel 340, changes the operation information stored in the storage unit 330, and displays the changed operation information on the touchscreen panel 340.

Hereinafter, input of operation instructions to the refrigerator 100 by a user through the touchscreen panel 400 and display of operation information of the refrigerator 100 through the touchscreen panel 400 will be described.

Figure 5:
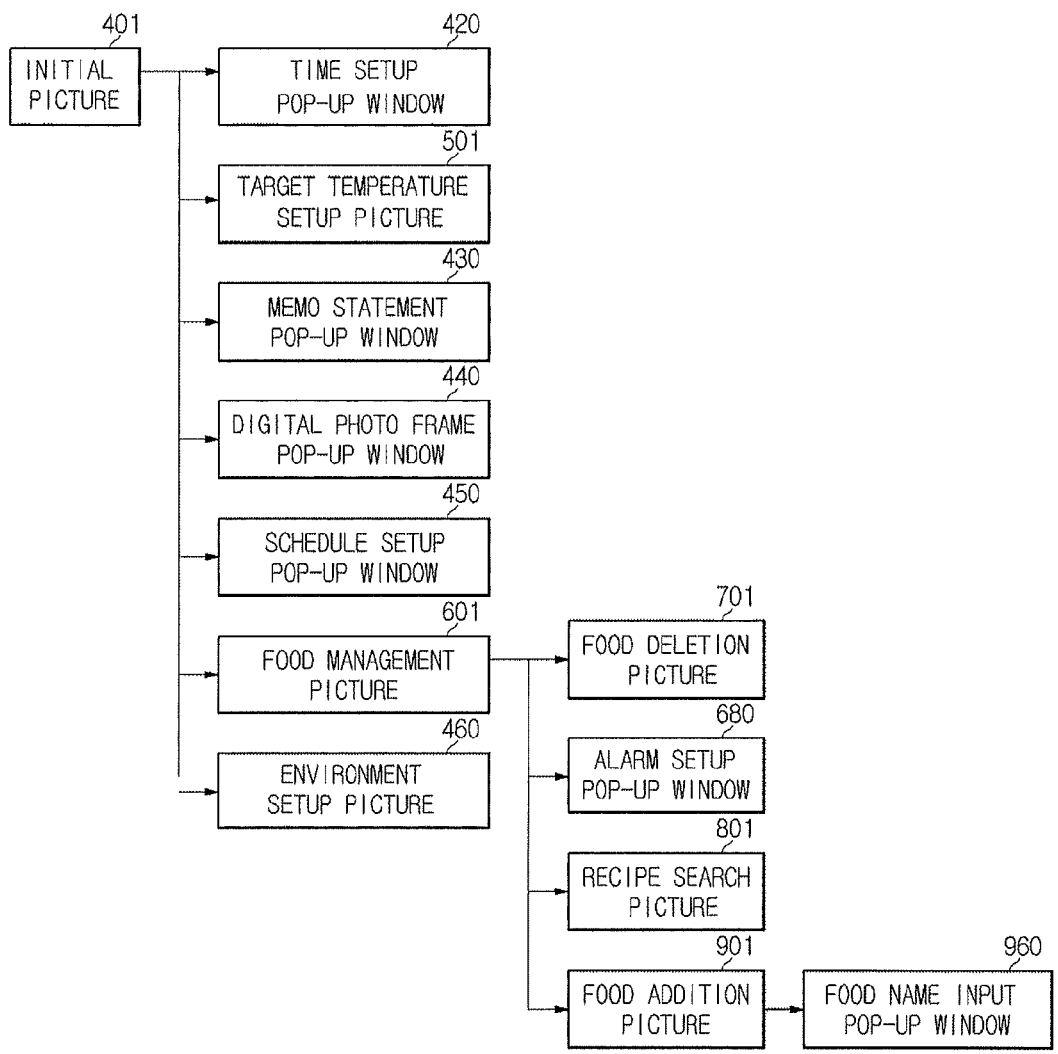
FIG. 5 is a view schematically illustrating pictures displayed on a touchscreen panel of the refrigerator in accordance with the embodiment of the present invention, according to user selection.

FIG. 5 is a view schematically illustrating pictures displayed on the touchscreen panel 400 of the refrigerator 100 in accordance with the embodiment of the present invention, according to user selection.

Prior to description of the pictures displayed on the touchscreen panel 400, picture display and pop-up display will be described. Picture display means that a new picture is displayed instead of a picture which is previously displayed on the touchscreen panel 400. For example, if a target temperature setup picture 501 which will be described later is displayed, the touchscreen panel 400 does not display an initial picture 401 anymore, and displays only the target temperature setup picture 501.

Pop-up display means that the picture previously displayed on the touchscreen panel 400 is continuously displayed and a new pop-up window is additionally displayed on the touchscreen panel 400. For example, when user selects a memo button 411 while the refrigerator 100 displays the initial picture 401, the refrigerator 100 additionally displays a memo statement pop-up window 430 while continuously displaying the initial picture 401. Further, in case of pop-up display, the refrigerator 100 recognizes only the case that the user touches a newly added pop-up window as operation instructions of the user, and does not recognize the case that the user touches a the previous picture other than the pop-up window as operation instructions of the user.

With reference to FIG. 5, the touchscreen panel 400 displays the initial picture 401 displaying current time and operation information of the refrigerator 100. Further, the touchscreen panel 400 may display a time setup pop-up window 420, the target temperature setup picture 501, the memo statement pop-up window 430, a digital photo frame pop-up window 440, a schedule setup pop-up window 450, a food management picture 601 and an environment setup picture 460 according to user selection on the initial picture 401.

Further, the touchscreen panel 400 may display a food deletion picture 701, an alarm setup pop-up window 680, a recipe search picture 801 and a food addition picture 901 according to user selection on the food management picture 601, and may display a food name input pop-up window 960 according to user selection on the food addition picture 901.

Figure 6:
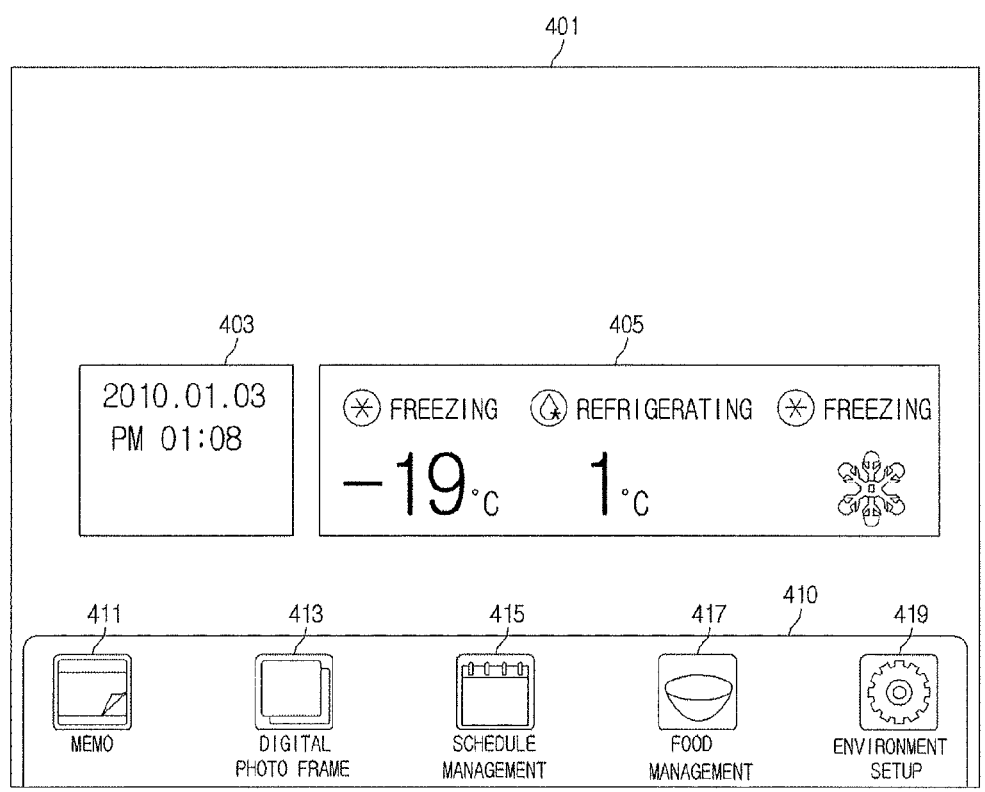
FIG. 6 is a view illustrating an initial picture displayed on the touchscreen panel of the refrigerator in accordance with the embodiment of the present invention.

FIG. 6 is a view illustrating the initial picture 401 displayed on the touchscreen panel 400 of the refrigerator 100 in accordance with the embodiment of the present invention.

With reference to FIG. 6, the initial picture 401 displayed on the touchscreen panel 400 includes a current time display area 403, a target temperature display area 405 and an initial menu display area 410.

The current time display area 403 is provided at the left region of the center of the initial picture 401 and displays current date and time. When a user inputs current time setup instructions by touching a portion of the touchscreen panel 400 corresponding to the current time display area 403, the touchscreen panel 400 displays the time setup pop-up window 420 to set current date and time on the initial picture 401. That is, the touchscreen panel 400 displays the time setup pop-up window 420 in addition to the initial picture 401.

The target temperature display area 405 is provided at the right region of the center of the initial picture 401 and displays target temperatures of the refrigerating chamber 121 and the freezing chamber 122 and an operation mode of the variable temperature chamber 123. When a user inputs target temperature setup instructions by touching a portion of the touchscreen panel 400 corresponding to the target temperature display area 405, the touchscreen panel 400 displays the target temperature setup picture 501 to set the target temperatures and the operation mode of the respective storage chambers 121, 122 and 123.

The initial menu display area 410 is provided at the lower end of the initial picture 401, and includes a memo button 411 to display the memo statement pop-up window 430 allowing a user to take notes, a digital photo frame button 413 to display the digital photo frame pop-up window 440 displaying photos stored in the storage unit 330 on the picture, a schedule setup button 415 to display the schedule setup pop-up window 450 allowing a user to record a schedule, a food management button 417 to display the food management picture 601 managing food items stored in the refrigerator 100, and an environment setup button 419 to display the environment setup picture 460 setting various variables regarding functions of the refrigerator 100.

When a user selects one of the buttons 411, 413, 415, 417 and 419 displayed in the initial menu display area 410 on the touchscreen panel 400, the touchscreen panel 400 of the refrigerator 100 displays a picture or a pop-up window corresponding to the selected button. For example, when the user inputs food management instructions by touching a portion of the initial menu display area 410 corresponding to the food management button 415, the touchscreen panel 400 displays the food management picture 601.

Figure 7:
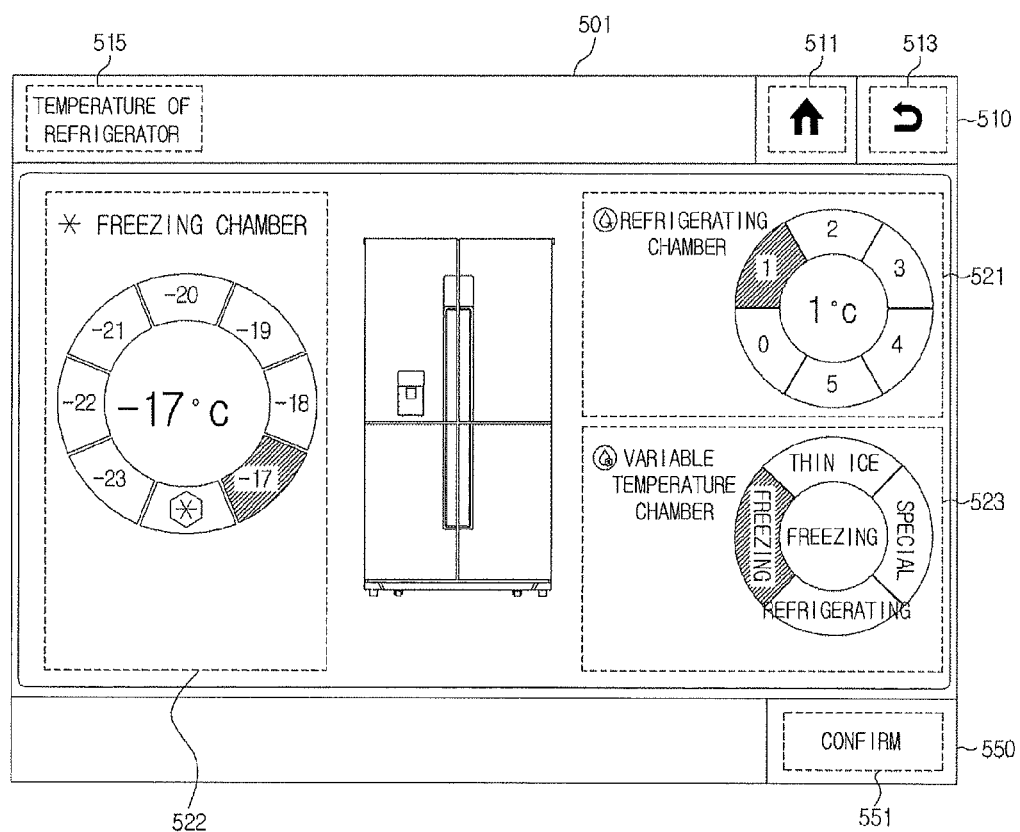
FIG. 7 is a view illustrating a target temperature setup picture displayed on the touchscreen panel of the refrigerator in accordance with the embodiment of the present invention.

FIG. 7 is a view illustrating the target temperature setup picture 501 of the touchscreen panel 400 in accordance with the embodiment of the present invention. When a user inputs target temperature setup instructions by touching the target temperature display area 405 on the initial picture 401 of the touchscreen panel 400, as described above, the touchscreen panel 400 displays the target temperature setup picture 501.

As shown in FIG. 7, the target temperature setup picture 501 includes a high-level menu display area 510, a refrigerating chamber target temperature setup area 521, a freezing chamber target temperature setup area 522, a variable temperature chamber operation mode setup area 523 and a low-level menu display area 550.

The high-level menu display area 510 includes a title 515 displaying the name of the currently selected and displayed picture, a home button 511 switching from the picture displayed on the touchscreen panel 400 to the initial picture 401, and a cancel button 513 switching from the picture displayed on the touchscreen panel 400 to the previously displayed picture.

The refrigerating chamber target temperature setup area 521 divides a ring-shaped refrigerating chamber target temperature setup menu 521a into plural regions so that a user may select a target temperature of the refrigerating chamber 121, and thus displays target temperatures of the refrigerating chamber 121 which may be set. The user may select a desired target temperature of the refrigerating chamber 121 by touching a portion of the ring-shaped refrigerating chamber target temperature setup menu 521a displaying the desired target temperature.

In the same manner as the refrigerating chamber target temperature setup area 521, the freezing chamber target temperature setup area 522 divides a ring-shaped freezing chamber target temperature setup menu 522a into plural regions, and thus displays target temperatures of the freezing chamber 122 which may be set. Thereby, a user may select a desired target temperature of the freezing chamber 122.

The variable temperature chamber operation mode setup area 523 divides a ring-shaped variable temperature chamber operation mode setup menu 523a into plural regions, and thus displays operation modes of the variable temperature chamber 123 which may be set. The variable temperature chamber operation mode setup menu 523a, as shown in FIG. 7, includes a freezing mode selection button to store food in a frozen state, a refrigerating mode selection button to store food in a refrigerated state, a special mode selection button to store fresh food, such as vegetables and fishes, and a thin ice mode selection button to set a target temperature to 0° C. A user may select an operation mode of the variable temperature chamber 123 by touching a button displaying a desired operation mode.

The low-level menu display area 550 including a confirm button 551 is provided at the lower end of the target temperature setup picture 501. When a user selects the target temperatures and the operation mode of the respective storage chambers 121, 122 and 123 using the respective target temperature setup areas 521, 522 and 523, as described above, and then touches a portion corresponding to the confirm button 551, the refrigerator 100 stores the target temperatures and the operation mode selected by the user in the storage unit 330, and controls the cooling apparatuses 201 and 202 so that the temperatures of the respective storage chambers 121, 122 and 123 may be maintained at the target temperatures selected by the user.

Figure 8:
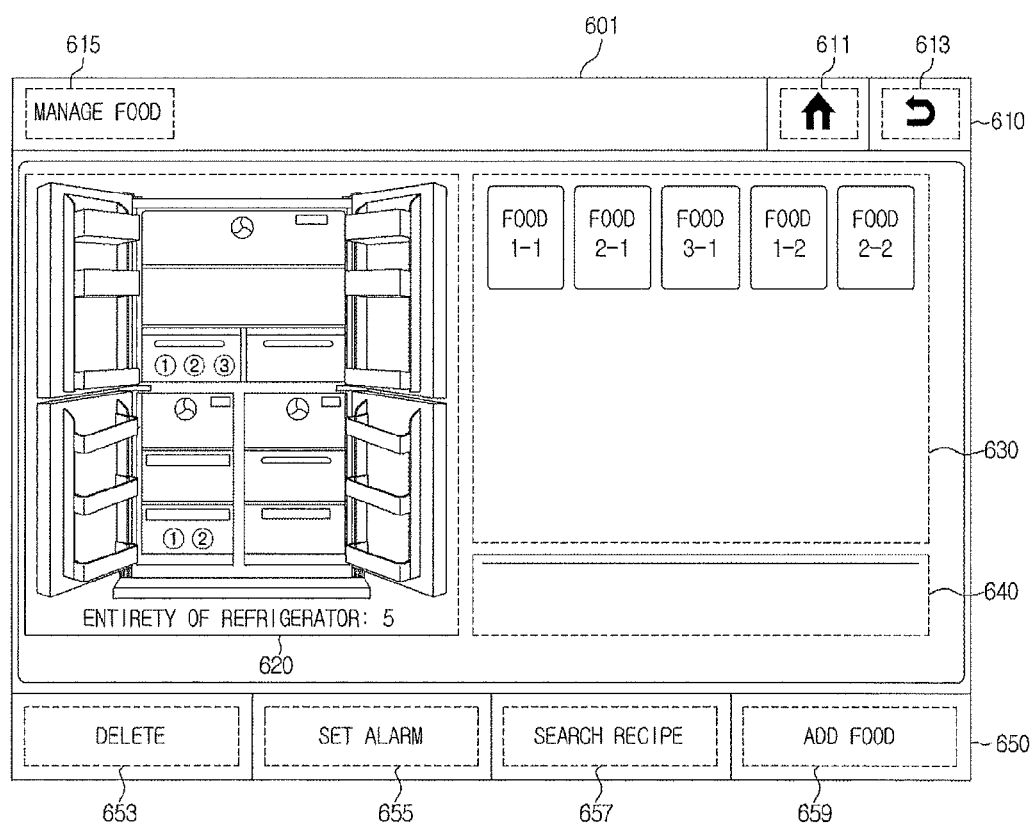
FIG. 8 is a view illustrating a food management picture displayed on the touchscreen panel of the refrigerator in accordance with the embodiment of the present invention.
Figure 9:
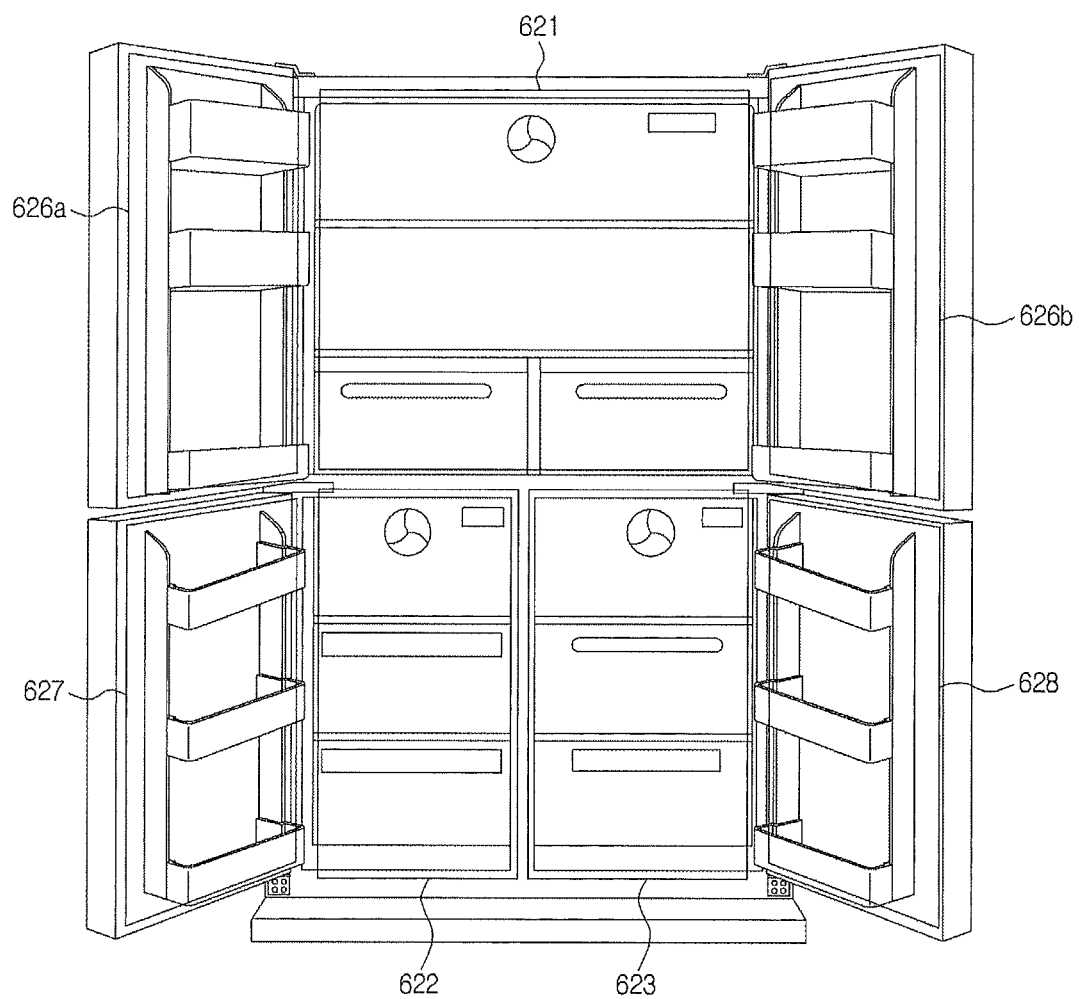
FIG. 9 is a view illustrating storage spaces of the refrigerator in accordance with the embodiment of the present invention.
Figure 10:
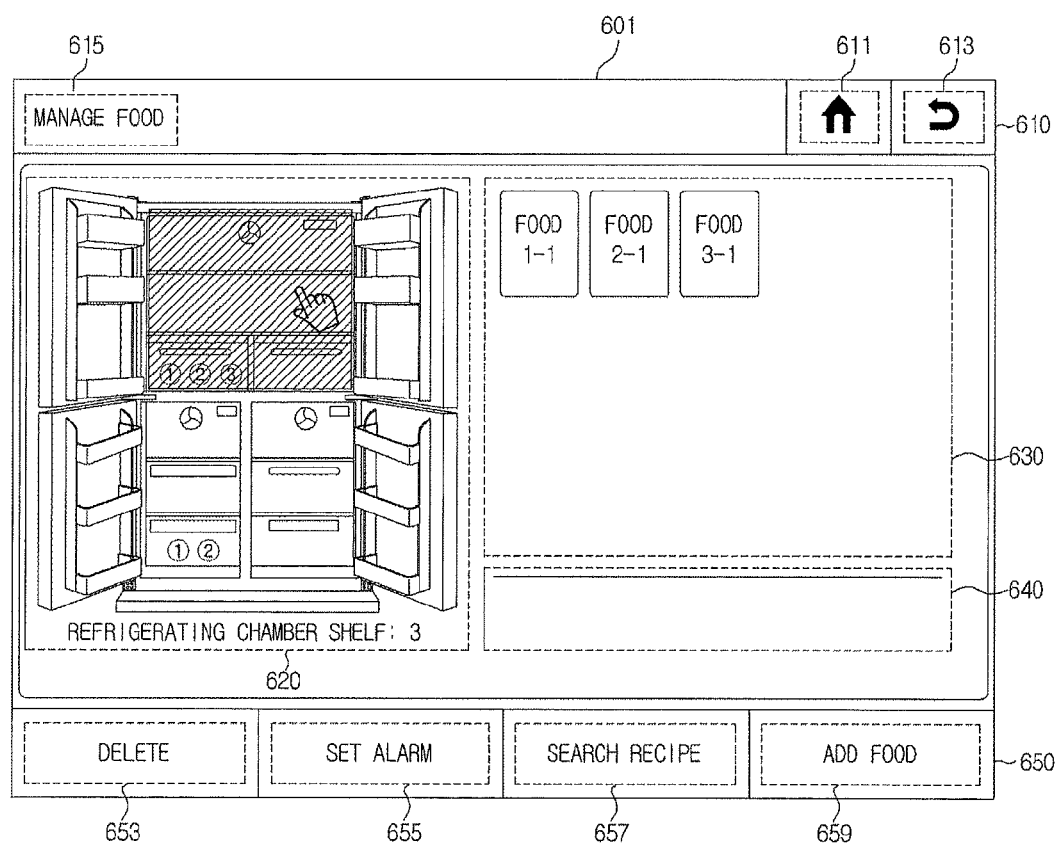
FIG. 10 is a view illustrating a food management picture displayed if a user selects one of the plural storage spaces through the touchscreen panel of the refrigerator in accordance with the embodiment of the present invention.

FIG. 8 is a view illustrating the food management picture 601 displayed on the touchscreen panel 400 of the refrigerator 100 in accordance with the embodiment of the present invention, FIG. 9 is a view illustrating storage spaces of the refrigerator 100 in accordance with the embodiment of the present invention, and FIG. 10 is a view illustrating the food management picture 601 displayed if a user selects one of the plural storage spaces through the touchscreen panel 400 of the refrigerator 100 in accordance with the embodiment of the present invention. When a user selects the food management button 417 of the initial menu display area 410 provided at the lower end of the touchscreen panel 400, as described above, the touchscreen panel 400 displays the food management picture 601.

With reference to FIGS. 8, 9 and 10, the food management picture 601 includes a high-level menu display area 610, a first storage space display area 620, a stored food display area 630, an additional information display area 640, and a low-level menu display area 650.

The high-level menu display area 610 includes a title 615 displaying the name of the picture which the touchscreen panel 400 displays, a home button 611 switching from the picture displayed on the touchscreen panel 400 to the initial picture 401, and a cancel button 613 switching from the picture displayed on the touchscreen panel 400 to the previously displayed picture.

The first storage space display area 620 displays plural storage spaces in which food may be stored. As shown in FIG. 9, the first storage space display area 620 is displayed so as to have the same shape as the shape of the storage chambers 121, 122 and 123 of the refrigerator 100 in accordance with the embodiment of the present invention, and is divided into a refrigerating chamber shelf storage area 621 corresponding to a shelf storage space of the refrigerating chamber 121, a refrigerating chamber first door storage area 626a corresponding to a storage space provided on the inner surface of the first door 131a of the refrigerating chamber 121, a refrigerating chamber second door storage area 626b corresponding to a storage space provided on the inner surface of the second door 131b of the refrigerating chamber 121, a freezing chamber shelf storage area 622 corresponding to a shelf storage space of the freezing chamber 122, a freezing chamber door storage area 627 corresponding to a storage space provided on the inner surface of the door 132 of the freezing chamber 122, a variable temperature chamber shelf storage area 623 corresponding to a shelf storage space of the variable temperature chamber 123, and a variable temperature chamber door storage area 628 corresponding to a storage space provided on the inner surface of the door 133 of the variable temperature chamber 123.

Further, in the respective storage areas 621, 622, 623, 626a, 626b, 627 and 628 of the first storage space display area 620, icons of food groups to which food items stored in the corresponding areas 621, 622, 623, 626a, 626b, 627 and 628 belong are displayed. For example, if "food 1-1" belonging to "food group 1" is stored in the shelf storage space of the refrigerating chamber 121, an icon ① corresponding to "food group 1" to which "food 1-1" belongs is displayed in the refrigerating chamber shelf storage area 621.

Further, the respective storage areas 621, 622, 623, 626a, 626b, 627 and 628 display and arrange food items, stored in the corresponding areas 621, 622, 623, 626a, 626b, 627 and 628, according to fresh storage period expiration dates which will be described later. For example, food items, the fresh storage periods of which have expired, or the fresh storage period expiration dates of which are approaching, are arranged at the left side of the lowest floor of each storage area, and other food items may be arranged in the rightward direction in order of fresh storage period expiration dates.

Further, the respective storage areas 621, 622, 623, 626a, 626b, 627 and 628 may vary colors of icons corresponding to food items stored in the corresponding areas 621, 622, 623, 626a, 626b, 627 and 628 according to fresh storage period expiration dates. For example, food items, the fresh storage periods of which have expired, may be expressed in red, food items, the fresh storage periods of which are expired within 1 week, may be expressed in orange, and other food items may be expressed in yellow.

Although the first storage space display area 620 of the refrigerator 100 in accordance with the embodiment of the present invention displays icons of food groups to which stored food items belong, embodiments of the present invention are not limited thereto and the first storage space display area 620 may display names of food groups to which corresponding food items belong, icons of the corresponding food items, or names of the corresponding food items.

Further, the number of food items stored in the refrigerator 100 is displayed at the lower end of the first storage space display area 620. When the initial picture 401 is switched to the food management picture 601, the total number of food items stored in all of the storage chambers 121, 122 and 123 of the refrigerator 100 is displayed, and when a user selects one of the plural storage spaces of the refrigerator 100 by touching one of the plural storage areas 621, 622, 623, 626a, 626b, 627 and 628 displayed in the first storage space display area 620, the number of food items stored in the corresponding storage space is displayed (with reference to FIG. 10).

The stored food display area 630 displays food items stored in the refrigerator 100. That is to say, the stored food display area 630 displays the names of the food items stored in the refrigerator 100.

When the initial picture 401 is switched to the food management picture 601, the stored food display area 630 displays the names of all food items stored in all storage spaces. Thereafter, when a user selects one of the plural storage areas 621, 622, 623, 626a, 626b, 627 and 628 displayed in the first storage space display area 620 of the food management picture 601, the first storage space display area 620 displays the selected storage area so as to be discriminated from other storage areas, and the stored food display area 630 displays the names of food items stored in the selected storage space, as shown in FIG. 10. For example, if a user selects the refrigerating chamber shelf storage area 621 from the storage areas 621, 622, 623, 626a, 626b, 627 and 628 displayed in the first storage space display area 620, the refrigerating chamber shelf storage area 621 is displayed so as to be discriminated from other storage areas, and "food 1-1", "food 2-1" and "food 3-1" stored in the shelf storage space of the refrigerating chamber 121 are displayed in the stored food display area 630.

Although FIG. 8 illustrates that the stored food display area 630 has a space in which 15 food item names may be displayed, the number of displayable food item names is not limited 15, and when 15 food items have been stored in the refrigerator 500, a scroll bar (not shown) may be generated at the right side of the stored food display area 630 and the number of food item names exceeding 15 may be displayed in the stored food display area 630 by the scroll bar (not shown).

Although the stored food display area 630 of the refrigerator 100 in accordance with the embodiment of the present invention displays the names of food items stored in the storage areas 621, 622, 623, 626a, 626b, 627 and 628 displayed in the first storage space display area 620, embodiments of the present invention are not limited thereto and the stored food display area 630 may display icons corresponding to the food items stored in the respective storage areas 621, 622, 623, 626a, 626b, 627 and 628 or and display fresh storage periods of the food items in addition to the names of the corresponding food items.

The additional information display area 640 displays the fresh storage period of a food item selected by a user or a description of the picture displayed on the touchscreen panel 400.

The low-level display area 650 includes a food addition button 659 to display the food deletion picture 701, a delete button 653 to delete a specific food item stored in a specific storage space, an alarm setup button 655 to set an alarm time to warn of expiration of the fresh storage period of a food item, and a recipe search button 657 to search recipes using food items stored in the refrigerator 100.

Figure 11:
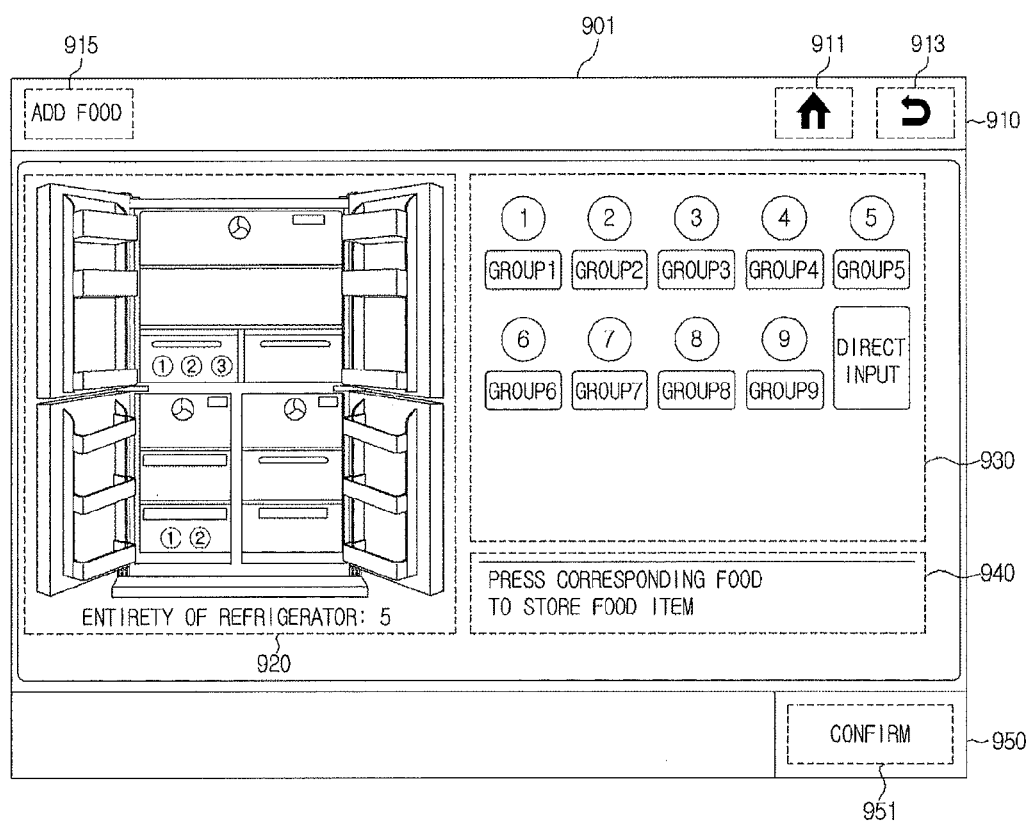
FIG. 11 is a view illustrating a food addition picture displayed on the touchscreen panel of the refrigerator in accordance with the embodiment of the present invention.
Figure 12A:
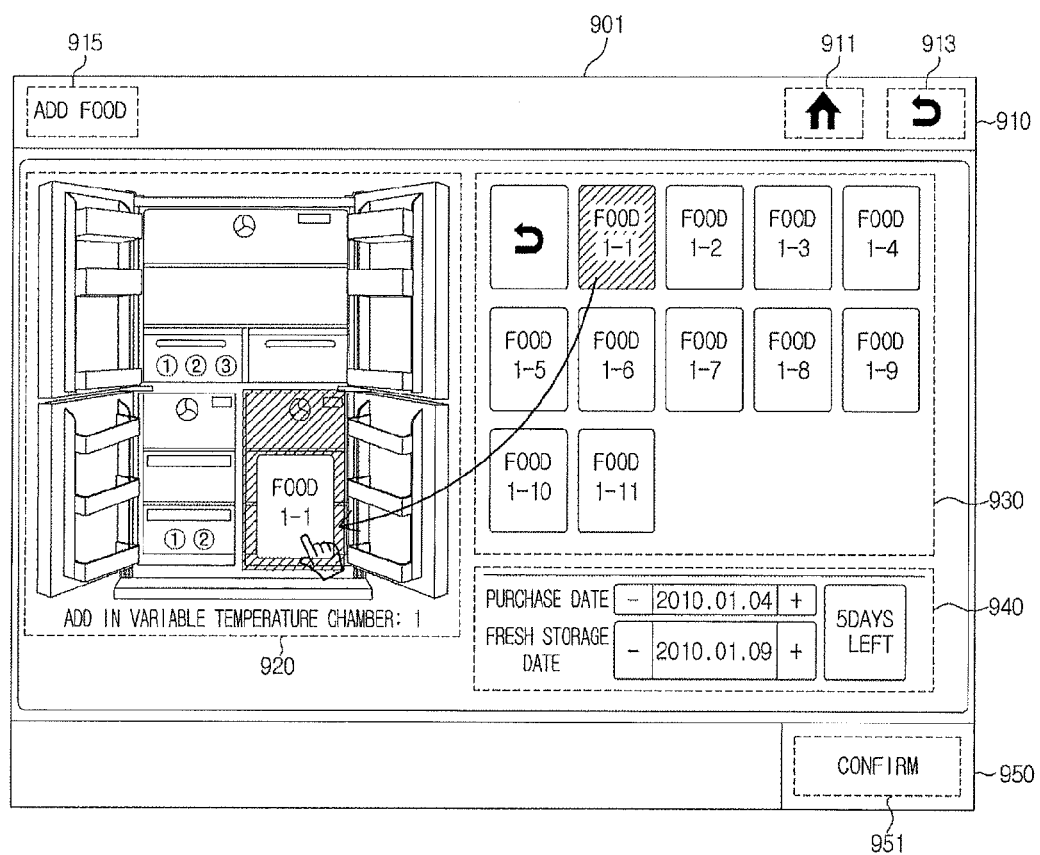
FIGS. 12A and 12B are views illustrating addition of a food item to be stored in the refrigerator through the touchscreen panel of the refrigerator in accordance with the embodiment of the present invention.
Figure 12B:
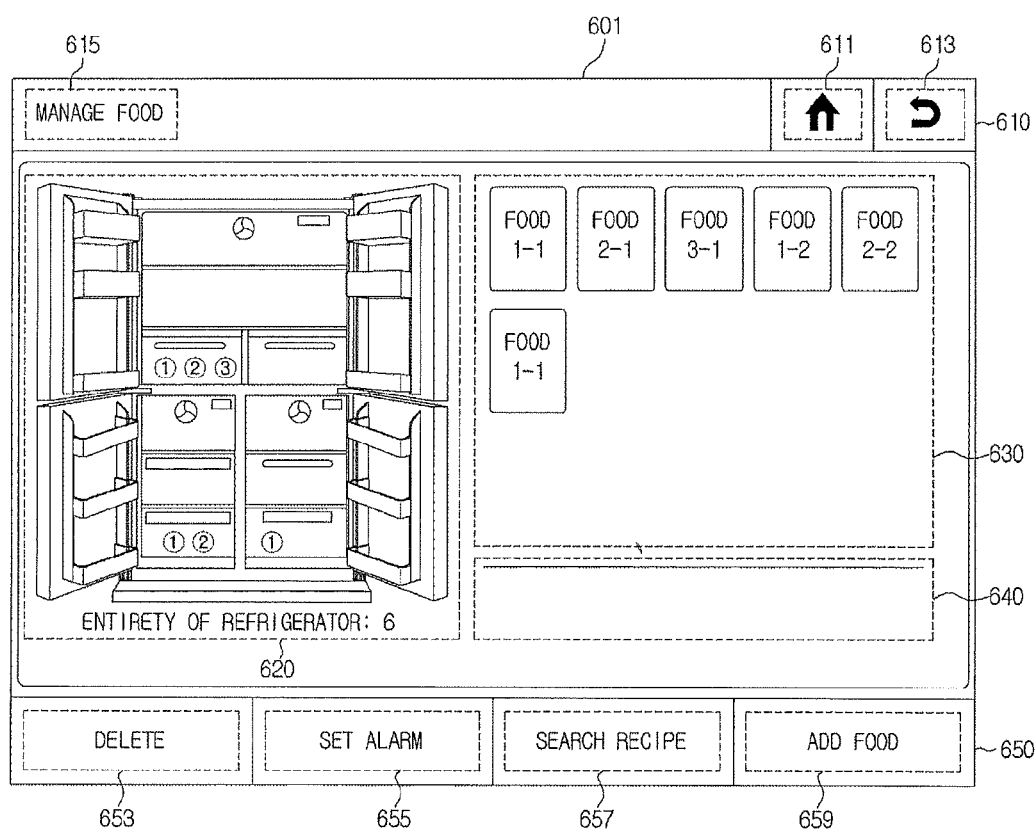

FIG. 11 is a view illustrating the food addition picture 901 displayed on the touchscreen panel 400 of the refrigerator 100 in accordance with the embodiment of the present invention, and FIGS. 12A and 12B are views illustrating addition of a food item to be stored in the refrigerator 100 through the touchscreen panel 400 of the refrigerator 100 in accordance with the embodiment of the present invention. When a user inputs food addition instructions by touching the food addition button 659 displayed at the lower end of the food management picture 601, as described above, the touchscreen panel 400 displays the food addition picture 901.

With reference to FIG. 11, the food addition picture 901 includes a high-level menu display area 910, a second storage space display area 920, an added food display area 930, an additional information display area 940, and a low-level menu display area 950.

The high-level display area 910 includes a title 915, a home button 911 and a cancel button 913. The title 915, the home button 911 and the cancel button 913 of the high-level display area 910 are the same as the title 615, the home button 611 and the cancel button 613 of the food management picture 601 described in FIG. 8, and a detailed description thereof will thus be omitted.

The second storage space display area 920 displays the storage spaces of the refrigerator 100. The configuration of the second storage space display area 920 is the same as the configuration of the first storage space display area 620 of the food management picture 601 described in FIG. 8, and a detailed description thereof will thus be omitted.

When the picture displayed on the touchscreen panel 400 is switched from the food management picture 601 to the food addition picture 901, the added food display area 930 displays icons of food groups to which food items to be stored in the refrigerator 100 belong, and the additional information display area 940 displays a message "Press corresponding food to store a food item" in order to notify a user of a food addition method.

When a user selects a food group, to which a food item desired to be stored in the refrigerator 100 belongs, by touching the icon of the food group, the added food display area 930 displays the names of food items belonging to the selected food group, as shown in FIG. 12A. For example, if the user desires to store "food 1-1" in the refrigerator 100, when the user selects the icon ① of "food group 1" to which "food 1-1" belongs, the touchscreen panel 400 may display "food 1-1", "food 1-2", "food 1-3" and "food 1-4" belonging to "food group 1" in the added food display area 930, and the additional information display area 940 may display a message "Press food and then drag food to refrigerator" in order to notify the user of a food addition method.

The user may select a specific food item name from among plural food item names displayed on the added food display area 930, and drag and move the selected food item name to a specific storage area of plural storage areas of the second storage space display area 920. When the user moves the food item name to the specific storage area of the plural storage areas, the touchscreen panel 400 displays the selected food item name so as to be discriminated from other food item names and displays the specific storage area to which the selected food item name is moved so as to be discriminated from other storage areas, thereby allowing the user to recognize the selected specific storage area and the selected food item. For example, when the user moves a food item name to a specific storage area of the plural storage areas, the touchscreen panel 400 displays the selected food item name so as to be discriminated from other food item names and displays the specific storage area so as to be discriminated from other storage areas, thus allowing the user to recognize the selected specific storage area and the selected food item. For example, when the user selects "food 1-1" and drags "food 1-1" to the variable temperature chamber shelf storage area 623 of the second storage space display area 920, the touchscreen panel 400 displays "food 1-1" and the variable temperature chamber shelf storage area 623 so as to be discriminated from other food items and other storage areas.

Further, the user may select a specific food item name from among the plural food item names displayed on the added food display area 930, and then select a specific storage area from among the plural storage areas of the second storage space display area 920, thus moving the selected specific food item from among plural food items to the specific storage area from among the plural storage areas of the second storage space display area 920. When the user selects a specific food item name from food item names, the touchscreen panel 400 displays the selected food item name so as to be discriminated from other food item names and displays the specific storage area so as to be discriminated from other storage areas, thereby allowing the user to recognize the selected food item and the selected specific storage area. For example, when the user selects "food 1-1" and then selects the variable temperature chamber shelf storage area 623 of the second storage space display area 920, the touchscreen panel 400 displays "food 1-1" and the variable temperature chamber shelf storage area 623 so as to be discriminated from other food items and other storage areas.

Further, the name of the storage chamber to which food items are added and the number of added food items are displayed at the lower end of the second storage space display area 920.

Further, when a user selects a specific food item name from among the plural food item names displayed on the added food display area 930 and drags and drops the selected food item name to a specific storage area of the second storage space display area 920, the additional information display area 940 displays a picture to set the fresh storage period of the selected specific food item. The picture to set the fresh storage period may include a purchase date selection unit to select the purchase date of an added food item, and a fresh storage period expiration date selection unit to select a fresh storage period expiration date, and for user convenience, a date at which a food item starts to be stored is set as the initial value of the purchase date and the user may change the purchase date. Further, based on the initial value of the purchase date or the input purchase date of a food item, the refrigerator 100 may display the fresh storage period expiration date of the corresponding food item using the fresh storage period of the corresponding food item, or the user may directly input the fresh storage period of the corresponding food item.

When the user selects a specific food item from the added food display area 940, moves the selected food item to a specific storage area of the second storage space display area 920, sets the purchase date and the fresh storage period of the food item and then touches a confirm button 951 which will be described later, the touchscreen panel 400 displays the icon of a food group to which the food item belongs in the second storage space display area 920.

Further, when the user selects a specific food item and moves the selected food item to a specific storage area, the corresponding food item name is fixed around the specific storage area, as shown in FIG. 12A. Thereafter, when the user touches the confirm button 951 which will be described later, the picture displayed on the touchscreen panel 400 is switched to the food management picture 601, and the icon of a food group to which the added food item belongs is additionally displayed in the storage area to which the food item is added, as shown in FIG. 12B. For example, as shown in FIG. 12A, when "food 1-1" is selected from the added food display area 930 and is moved to the variable temperature chamber shelf storage area of the second storage space display area 920, the added food item name "food 1-1" is displayed in the variable temperature chamber shelf storage area 623, and when the user touches the confirm button 951, the icon of the food group "food group 1" to which "food 1-1" belongs is displayed in the variable temperature chamber shelf storage area 623, as shown in FIG. 12B.

Further, prior to storage of the added food item, if another food item is already stored in the corresponding storage area, the food items are displayed so as to be arranged according to fresh storage period expiration dates.

FIGS. 13A, 13B, 13C and 13D are views illustrating input of a new food item through the touchscreen panel 400 of the refrigerator 100 in accordance with the embodiment of the present invention.

Figure 13A:
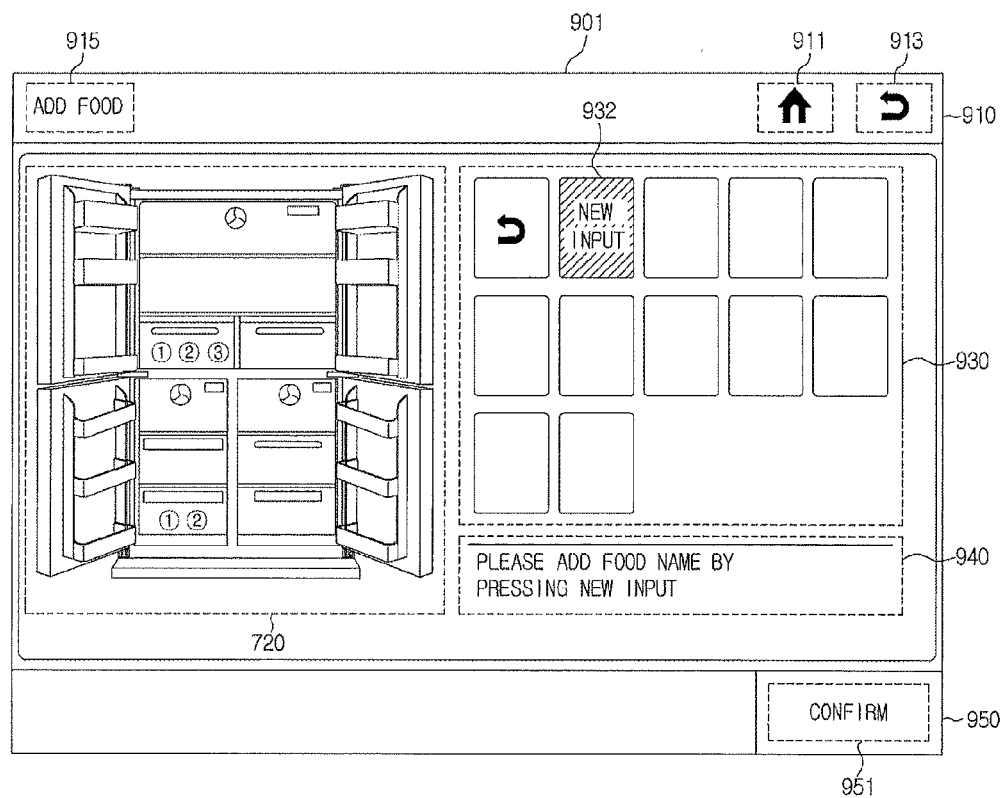
FIGS. 13A, 13B, 13C and 13D are views illustrating input of a new food name through the touchscreen panel of the refrigerator in accordance with the embodiment of the present invention.
Figure 13B:
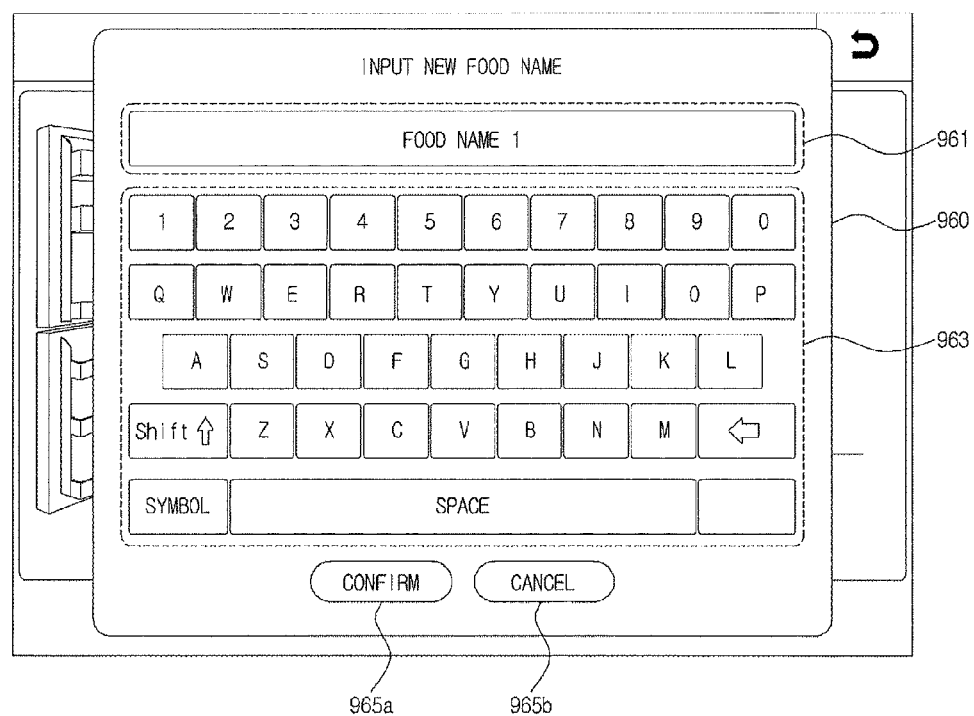

The added food display area 930 of the food addition picture 901 displays a direct input icon allowing a user to directly input a food item name, as shown in FIG. 11. When the user selects the direct input icon displayed in the added food display area 930, the touchscreen panel 400 displays a new input button 932 allowing the user to directly input a food item name and the food item name which is newly input by the user in the added food display area 930, as shown in FIG. 13A. That is to say, the food item directly input by the user belongs to a food group named 'direct input' separated from a food group to which the corresponding food item substantially belongs.

When the user selects the new input button 932 to newly input a food item name desired to be stored in the refrigerator 100, the touchscreen panel 400 displays the food name input pop-up window 960.

The food name input pop-up window 960 includes a food name display unit 961 displaying an input food item name, and a food name input unit 963 to input the food item name. The food name input pop-up window 960 may include a confirm button 965a to confirm input of a food item name, and a cancel button 965b to cancel input of the food item name. The input food item name may be in Korean or in English according to user selection, but is not limited thereto.

Figure 13C:
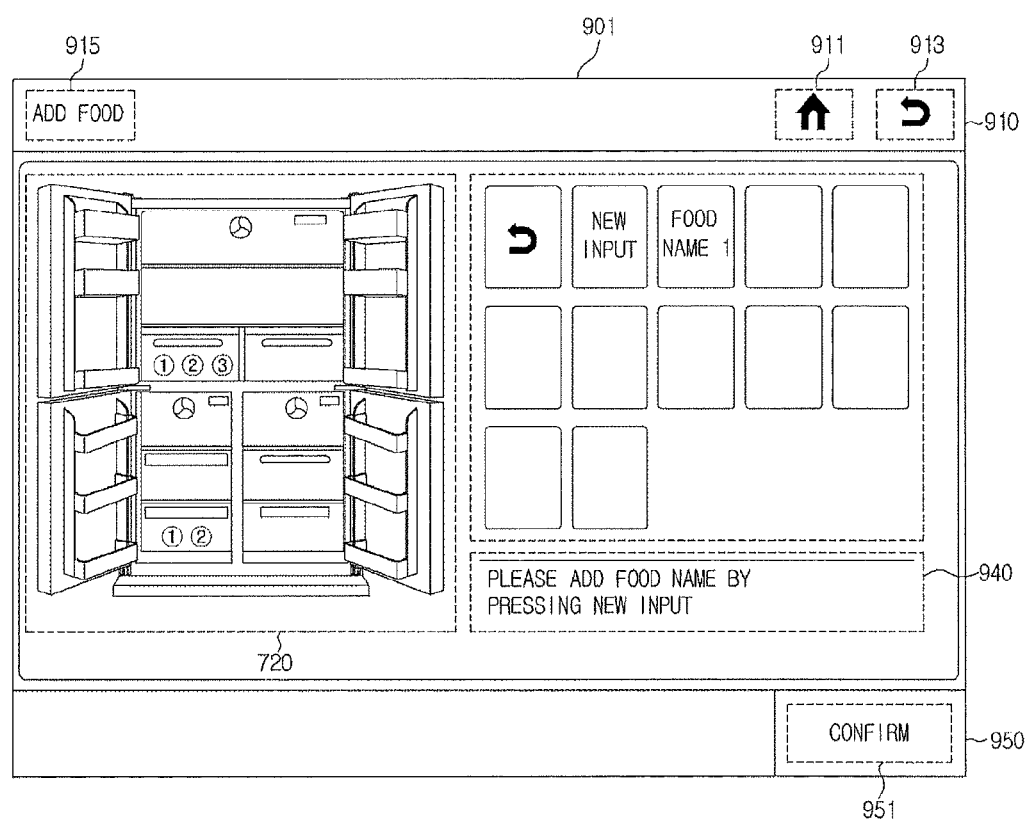
Figure 13D:
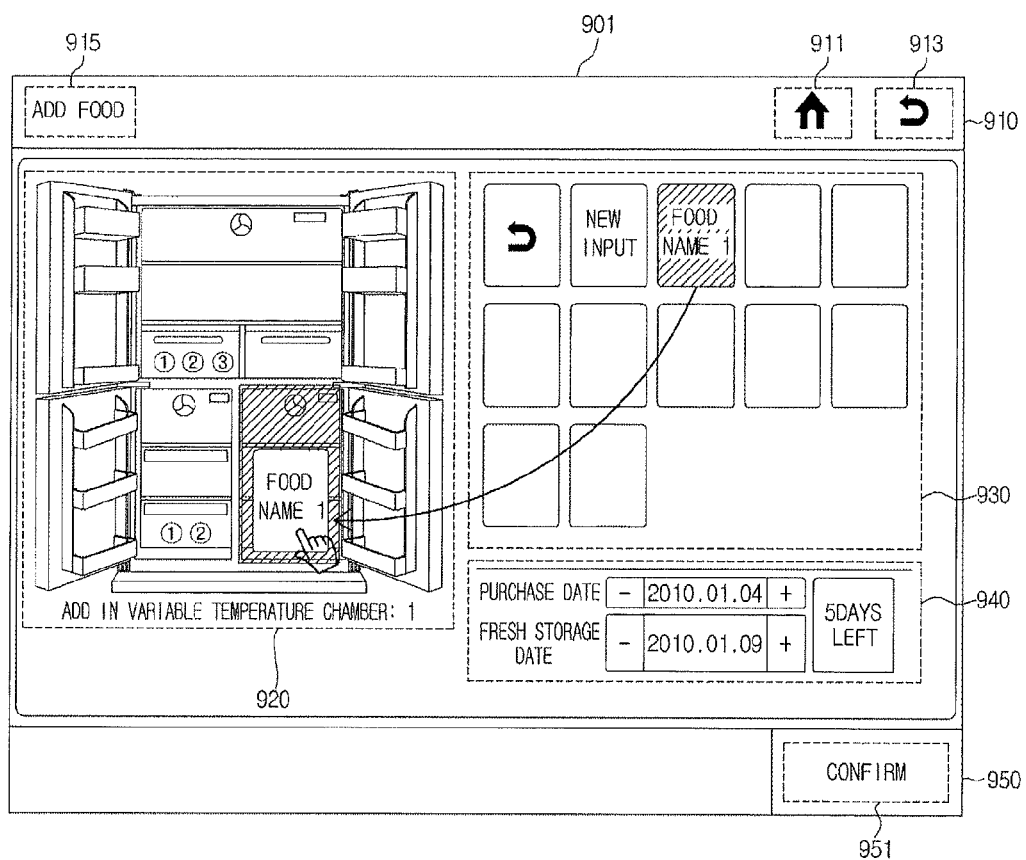

When a new food item name is input through the food name input pop-up window 960, the new food item name is additionally displayed in the added food display area 930, as shown in FIG. 13C, and the user may select the new food item name and drags and move the selected new food item name to a specific storage area of the second storage space display area 920, as shown in FIG. 13D.

Figure 14A:
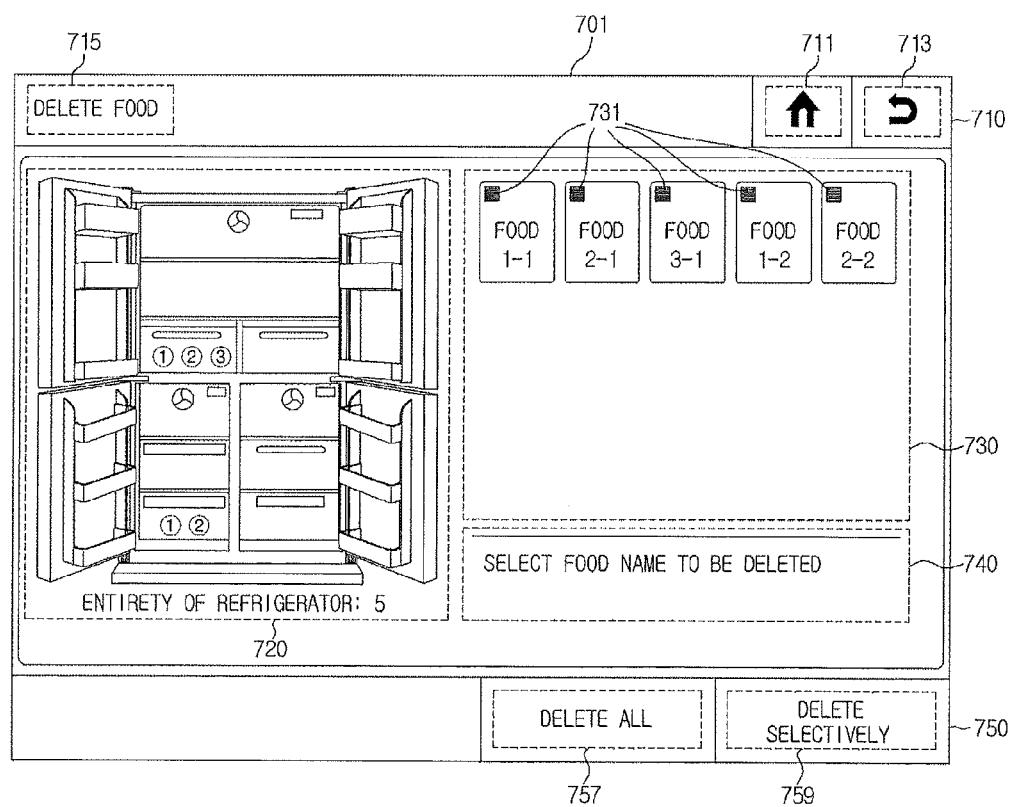
FIGS. 14A and 14B are views illustrating a food deletion picture displayed on the touchscreen panel of the refrigerator in accordance with the embodiment of the present invention.
Figure 14B:
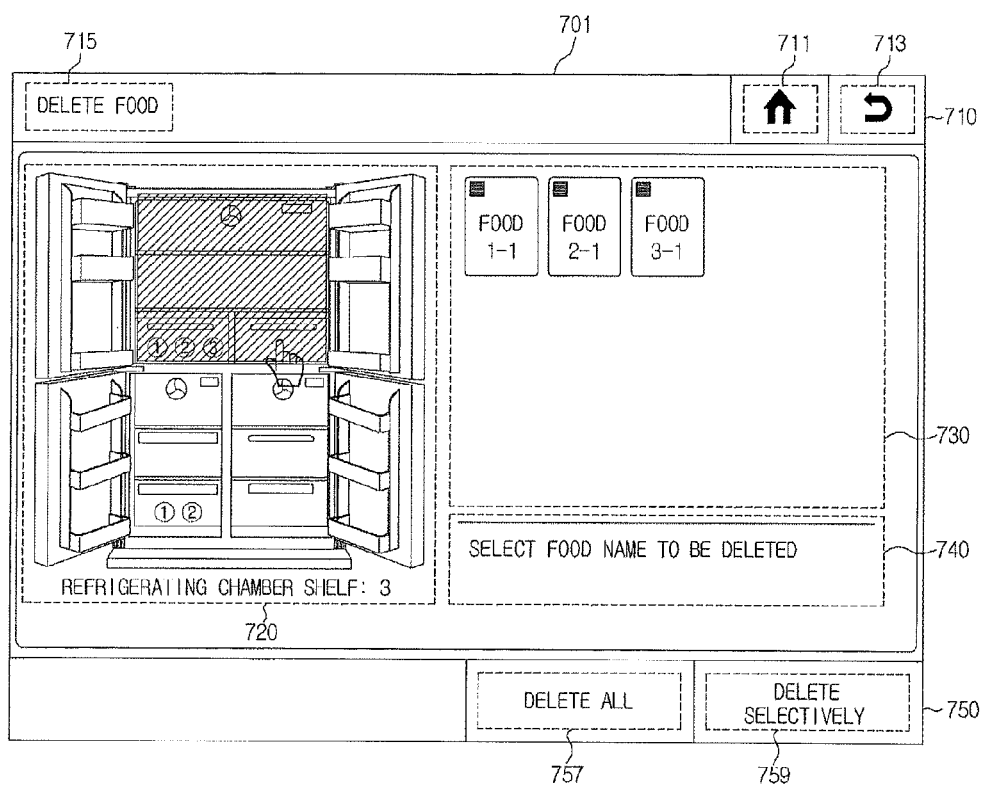

FIGS. 14A and 14B are views illustrating the food deletion picture 701 displayed on the touchscreen panel 400 of the refrigerator 100 in accordance with the embodiment of the present invention. When a user selects the delete button 653 provided at the food management picture 601, as described above, the touchscreen panel 400 displays the food deletion picture 701.

The food deletion picture 701 includes a high-level menu display area 710, a third storage space display area 720, a deleted food display area 730, an additional information display area 740, and a low-level menu display area 750.

The high-level display area 710 includes a title 715, a home button 711 and a cancel button 713. The title 715, the home button 711 and the cancel button 713 of the high-level display area 710 are the same as the title 615, the home button 611 and the cancel button 613 of the food management picture 601 described in FIG. 8, and a detailed description thereof will thus be omitted.

The third storage space display area 720 displays storage areas corresponding to the storage spaces provided in the refrigerator 100. The configuration of the third storage space display area 720 is the same as the configuration of the first storage space display area 620 of the food management picture 601 described in FIG. 8, and a detailed description thereof will thus be omitted.

The deleted food display area 730 displays names of food items stored in the entirety of the refrigerator 100 or a specific storage space. Further, each of the respective food item names includes a check box 731 to select deleted food items.

The additional information display area 740 displays a method to delete the food items displayed in the deleted food display area 730 to a user.

The low-level menu display area 750 includes an all delete button 757 to delete all of the food items displayed in the deleted food display area 730, and a selectively delete button 759 to delete selected food items from the food items displayed in the deleted food display area 730.

When a user selects the delete button 653 of the low-level menu display area 650 under the condition that none of the plural storage areas displayed in the first storage space display area 620 of the above-described food management picture 601 is selected, the deleted food display area 730 displays names of food items stored in all the storage spaces, as shown in FIG. 14A. Here, the user may delete all of the food items stored in all the storage spaces through the all delete button 757, or delete only selected food items through the selectively delete button 759.

Further, when a user selects a specific storage area from among the plural storage areas displayed in the first storage space display area 620 of the above-described food management picture 601 and then selects the delete button 653, or selects a specific storage area from among the plural storage areas displayed in the third storage space display area 720 of the food deletion picture 701, the deleted food display area 730 displays names of food items stored in the specific storage area selected in the food management picture 601 or the food deletion picture 701, and the third storage space display area 720 displays the selected specific storage area so as to be discriminated from other storage areas. Here, the user may delete all of the food items stored in the selected storage area through the all delete button 757, or select specific food items and then delete only the selected food items through the selectively delete button 759.

Figure 15:
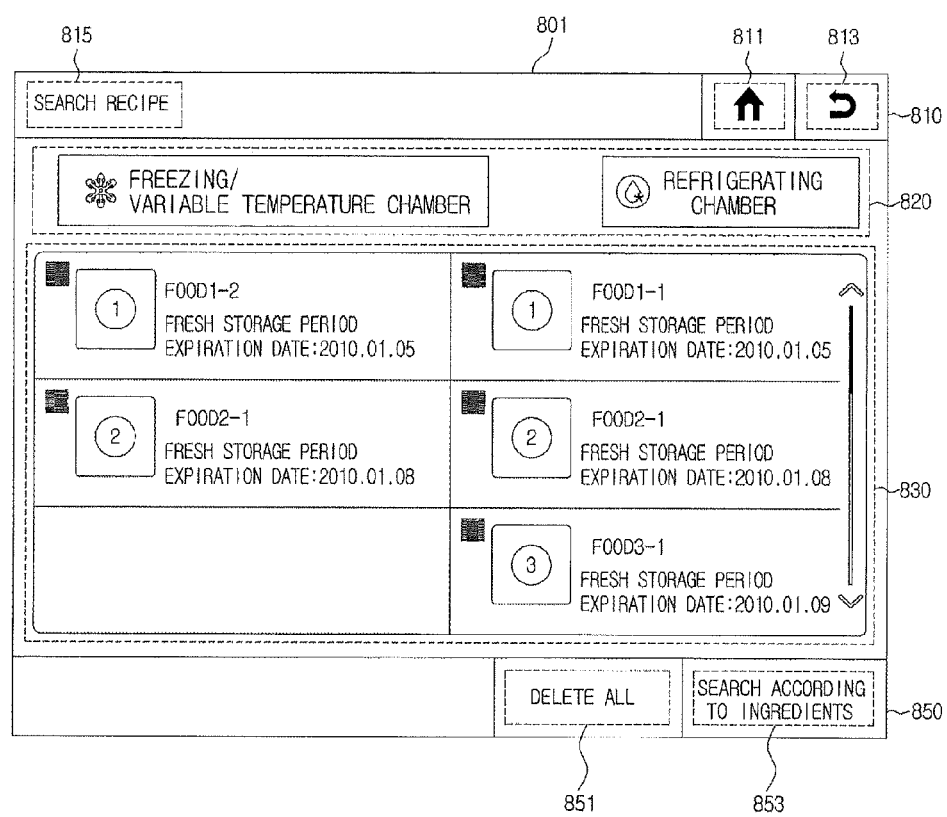
FIG. 15 is a view illustrating recipe search through the touchscreen panel of the refrigerator in accordance with the embodiment of the present invention.

FIG. 15 is a view illustrating recipe search through the touchscreen panel 400 of the refrigerator 100 in accordance with the embodiment of the present invention.

When a user inputs recipe search instructions through the recipe search button 657 provided at the lower end of the food management picture 601, the refrigerator 100 displays the recipe search picture 801 on the touchscreen panel 400.

With reference to FIG. 15, the recipe search picture 801 includes a high-level menu display area 810, a storage chamber display area 820, a recipe ingredient display area 830, and a low-level menu display area 850. When a user touches the recipe search button 657 of the food management picture 601, as described above, the touchscreen panel 400 displays the recipe search picture 801.

The high-level display area 810 includes a title 815, a home button 811 and a cancel button 813. The title 815, the home button 811 and the cancel button 813 of the high-level display area 810 are the same as the title 615, the home button 611 and the cancel button 613 of the food management picture 601 described in FIG. 8, and a detailed description thereof will thus be omitted.

The storage chamber display area 820 displays the respective storage chambers of the refrigerator 100, i.e., the refrigerating chamber 121 located at the upper portion and the freezing chamber 122 and the variable temperature chamber 123 located at the lower portion, so as to be discriminated from each other.

The recipe ingredient display area 830 discriminately displays food items stored in the refrigerating chamber 121, the freezing chamber 122 and the variable temperature chamber 123. For example, the recipe ingredient display area 830 discriminately displays "food 1-2" and "food 2-2" stored in the freezing chamber 122 and the variable temperature chamber 123 and "food 1-1" "food 2-1" and "food 3-1" stored in the refrigerating chamber 121. Further, the recipe ingredient display area 830 includes recipe ingredient check boxes 831 to select specific food items.

The low-level menu display area 850 includes an all select button 851 and a recipe search button 853.

All of food items stored in the storage chambers 121, 122 and 123 are selected through the all select button 851. Specifically, when a user touches the all select button 851, a check mark (V) is displayed in the recipe ingredient check boxes 831 of all of the food items displayed in the recipe ingredient display area 830.

The user inputs search instructions to display recipes using selected food items as ingredients through the recipe search button 853. That is, recipes using the food items provided with the recipe ingredient check boxes 831 with the check mark (V) of the recipe ingredient display area 830 are displayed.

For example, when "food 1-2" is selected and the recipe search button 853 is touched, the touchscreen panel 400 displays recipes using "food 1-2" as an ingredient, and when "food 1-2" and "food 1-1" are selected and the recipe search button 853 is touched, the touchscreen panel 400 displays recipes using "food 1-2" and "food 1-1" as ingredients and recipes using food 1-2" or "food 1-1" as an ingredient, in order.

Figure 16:
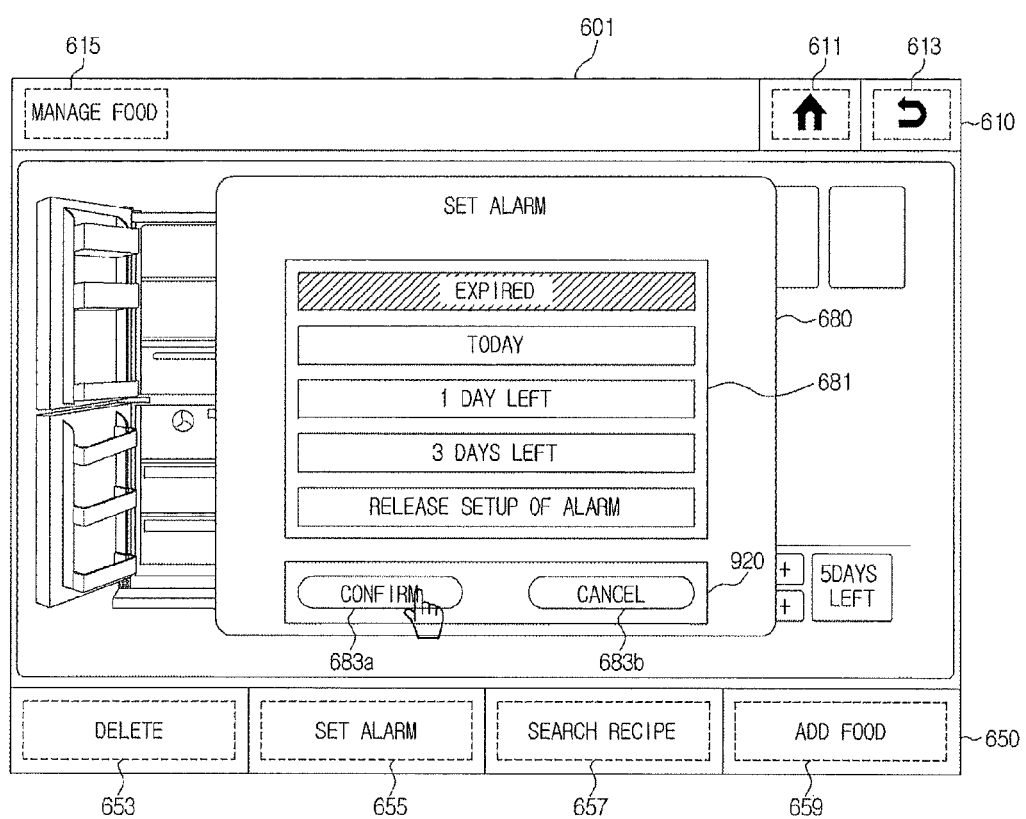
FIG. 16 is a view illustrating setup of a fresh storage period expiration date alarm through the touchscreen panel of the refrigerator in accordance with the embodiment of the present invention.

FIG. 16 is a view illustrating setup of a fresh storage period alarm through the touchscreen panel 400 of the refrigerator 100 in accordance with the embodiment of the present invention. When a user touches the alarm setup button 655 of the food management picture 601, as described above, the touchscreen panel 400 displays the alarm setup pop-up window 680 to warn of approach or expiration of a fresh storage period.

When the fresh storage period of a food item has expired or the expiration date of the fresh storage period of the food item is approaching, the refrigerator 100 warns the user of this fact. Specifically, the initial picture 401 of the touchscreen panel 400 of the refrigerator 100 displays a warning message representing that food items, the fresh storage periods of which have expired or the expiration dates of the fresh storage periods of which are approaching, are stored in the refrigerator 100.

The alarm setup pop-up window 680 includes an alarm time setup area 681 to set a time of displaying the above-described warning message. The alarm time setup area 681 includes a period expiration button to issue an alarm after expiration of a fresh storage period, a today button to issue an alarm at a fresh storage period expiration date, a 1 day left button to issue an alarm one day before expiration of a fresh storage period, a 3 day left button to issue an alarm three days before expiration of a fresh storage period, and an alarm setup release button to release setup of an alarm.

That is to say, if a food item, the fresh storage period of which has expired or the expiration date of the fresh storage period of which is approaching, is stored in the refrigerator 100, a user may set an alarm time. Specifically, when the user touches one of the above-described buttons and then touches a confirm button 683a, an alarm time is set.

As is apparent from the above description, a refrigerator in accordance with one embodiment of the present invention provides a food management picture through a touchscreen panel so as to easily detect storage positions, storage periods, and fresh storage periods of food items stored in the refrigerator, thus effectively managing the stored food items.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A refrigerator comprising:
   storage chambers including a plurality of storage spaces;
   a display panel to receive touch input of a user and to display a food management picture to manage food items stored in the storage chambers according to the touch input; and
   a controller to control the display panel,
   wherein the food management picture includes:
      a first region including a plurality of storage space display regions indicating the plurality of storage spaces, respectively, the plurality of storage space display regions displaying at least one group indicator indicating at least one food group, respectively; and
      a second region to display at least one food indicator indicating at least one food item, respectively,
   wherein, when a first storage space display region displaying a first group indicator indicating a first food group is selected among the plurality of storage space display regions by the user, the controller controls the display panel to display, on the second region, the at least one food indicator indicating the at least one food item belonging to the first food group.

2. The refrigerator according to claim 1, wherein when the first storage space display region is selected by the user, the controller controls the display panel such that the first storage space display region is discriminated from other storage space display regions.

3. The refrigerator according to claim 1, wherein the at least one group indicator is arranged according to fresh storage periods and displayed in the first region.

4. The refrigerator according to claim 1, wherein the number of the at least one group indicator is displayed on the first region.

5. A refrigerator comprising:
   storage chambers including a plurality of storage spaces;
   a display panel to receive touch input of a user and to display a food management picture to manage the food items stored in the storage chambers according to the touch input; and
   a controller to control the display panel,
   wherein the food management picture includes:
      a first region including a plurality of storage space display regions indicating the plurality of storage spaces, respectively, the plurality of storage space display regions displaying at least one group indicator indicating at least one food group, respectively; and
      a second region to display at least one food indicator indicating at least one food item, respectively,
   wherein, when a first food indicator indicating a first food item belonging to a first food group is moved from the second region to a first storage space display region in the first region by the user, the controller controls the display panel to display, on the first storage space display region, a first group indicator indicting the first food group.

6. The refrigerator according to claim 5, wherein when the first storage space display region is selected by the user, the controller controls the display panel such that the first storage space display region is discriminated from other storage space display regions.

7. The refrigerator according to claim 5, wherein the at least one group indicator is arranged according to fresh storage periods and displayed in the first region.

8. The refrigerator according to claim 5, wherein the number of the at least one group indicator is displayed on the first region.

9. The refrigerator according to claim 5, wherein, when a food name input command is input by the user, the controller displays a food name input picture on the display panel.

10. A refrigerator comprising:
    storage chambers including a plurality of storage spaces;
    a display panel to receive touch input of a user and to display a food management picture to manage food items stored in the storage chambers according to the touch input; and
    a controller to control the display panel,
    wherein the food management picture includes:
       a first region including a plurality of storage space display regions indicating the plurality of storage spaces, respectively, the plurality of storage space display regions displaying at least one group indicator indicating at least one food group, respectively; and
       a second region to display at least one food indicator indicating at least one food item, respectively,
    wherein, when a first storage space display region displaying a first group indicator indicating a first food group is selected and a deletion command is inputted by the user, the controller controls the display panel to remove the first group icon from the first storage space display region and to remove a first food indicator indicating a first food item belonging to the first food group from the second region.

11. The refrigerator according to claim 10, when the first food indicator displayed in the second region is selected and a deletion command is inputted by the user, the controller deletes both the first group indicator displayed in the first region and the first food indicator displayed in the second region.

12. The refrigerator according to claim 10, wherein, when all deletion command is inputted by user, the controller deletes both the at least one group indicator displayed in the first region and the at least one food indicator displayed in the second region.

13. The refrigerator according to claim 10, wherein when the first storage space display region is selected by the user, the controller controls the display panel such that the first storage space display region is discriminated from other storage space display regions.

14. The refrigerator according to claim 10, wherein the at least one group indicator is arranged according to fresh storage periods and displayed in the first region.

15. The refrigerator according to claim 10, wherein the number of the at least one group indicator is displayed on the first region.

\* \* \* \* \*